(12) United States Patent
Maes

(10) Patent No.: US 8,583,830 B2
(45) Date of Patent: Nov. 12, 2013

(54) INTER-WORKING WITH A WALLED GARDEN FLOOR-CONTROLLED SYSTEM

(75) Inventor: Stephane H. Maes, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 227 days.

(21) Appl. No.: 12/948,075

(22) Filed: Nov. 17, 2010

(65) Prior Publication Data

US 2011/0119404 A1  May 19, 2011

Related U.S. Application Data

(60) Provisional application No. 61/262,781, filed on Nov. 19, 2009.

(51) Int. Cl.
*G06F 15/16* (2006.01)

(52) U.S. Cl.
USPC .......................................... 709/249; 709/227

(58) Field of Classification Search
USPC .................................................. 709/249, 227
See application file for complete search history.

(56) References Cited

U.S. PATENT DOCUMENTS

| | | |
|---|---|---|
| 5,414,812 A | 5/1995 | Filip et al. |
| 5,613,060 A | 3/1997 | Britton et al. |
| 5,699,513 A | 12/1997 | Feigen et al. |
| 5,786,770 A | 7/1998 | Thompson |
| 5,850,517 A | 12/1998 | Verkler et al. |
| 5,867,665 A | 2/1999 | Butman et al. |
| 5,946,634 A | 8/1999 | Korpela |
| 6,115,690 A | 9/2000 | Wong |
| 6,119,104 A | 9/2000 | Brumbelow |
| 6,128,645 A | 10/2000 | Butman et al. |
| 6,157,941 A | 12/2000 | Verkler et al. |
| 6,163,800 A | 12/2000 | Ejiri |
| 6,192,414 B1 | 2/2001 | Horn |
| 6,230,271 B1 | 5/2001 | Wadlow et al. |
| 6,272,556 B1 | 8/2001 | Gish |

(Continued)

FOREIGN PATENT DOCUMENTS

| | | |
|---|---|---|
| EP | 20034748 A1 | 3/2009 |
| WO | 2007134468 A1 | 11/2007 |

OTHER PUBLICATIONS

Andrews, Tony et al., Business Process Execution Language for Web Services, Version 1.1, BEA Systems, International Business Machines Corporation, SAP AG, Siebel Systems, May 5, 2003, 31 pages.

(Continued)

*Primary Examiner* — El Hadji Sall
(74) *Attorney, Agent, or Firm* — Kilpatrick Townsend & Stockton LLP

(57) ABSTRACT

Embodiments of the invention provide systems and methods for inter-working between a walled garden service such as a push-to-talk service and a communication session outside of the walled garden service. According to one embodiment, a system can comprise a first communication network adapted to provide a walled garden service and support a first communication session of the walled garden service and a second communication network adapted to support a second communication session. The second communication session can occur outside of the walled garden service. The system can also include an inter-working service communicatively coupled with the first communication network and the second communication network. The inter-working service can be adapted to provide an interface between the first communication session and the second communication session.

31 Claims, 7 Drawing Sheets

(56) References Cited

U.S. PATENT DOCUMENTS

| | | |
|---|---|---|
| 6,275,857 B1 | 8/2001 | McCartney |
| 6,374,305 B1 | 4/2002 | Gupta et al. |
| 6,466,984 B1 | 10/2002 | Naveh et al. |
| 6,496,864 B1 | 12/2002 | McCartney |
| 6,553,108 B1 | 4/2003 | Felger |
| 6,578,159 B1 | 6/2003 | Kitagawa et al. |
| 6,611,812 B2 | 8/2003 | Hurtado et al. |
| 6,748,570 B1 | 6/2004 | Bahrs et al. |
| 6,792,605 B1 | 9/2004 | Roberts et al. |
| 6,813,278 B1 | 11/2004 | Swartz et al. |
| 6,868,413 B1 | 3/2005 | Grindrod et al. |
| 6,978,348 B2 | 12/2005 | Belknap et al. |
| 6,985,939 B2 | 1/2006 | Fletcher et al. |
| 7,003,578 B2 | 2/2006 | Kanada et al. |
| 7,042,988 B2 | 5/2006 | Juitt et al. |
| 7,043,538 B2 | 5/2006 | Guedalia et al. |
| 7,073,055 B1 | 7/2006 | Freed et al. |
| 7,089,317 B2 | 8/2006 | Jeyaraman et al. |
| 7,111,060 B2 | 9/2006 | Araujo et al. |
| 7,114,146 B2 | 9/2006 | Zhang et al. |
| 7,114,148 B2 | 9/2006 | Irving et al. |
| 7,133,669 B2 | 11/2006 | Nair et al. |
| 7,143,094 B2 | 11/2006 | Arroyo et al. |
| 7,146,616 B2 | 12/2006 | Dorner et al. |
| 7,185,342 B1 | 2/2007 | Carrer et al. |
| 7,194,482 B2 | 3/2007 | Larkin et al. |
| 7,222,148 B2 | 5/2007 | Potter et al. |
| 7,222,334 B2 | 5/2007 | Casati et al. |
| 7,272,625 B1 | 9/2007 | Hannel et al. |
| 7,281,029 B2 | 10/2007 | Rawat |
| 7,295,532 B2 | 11/2007 | Haller et al. |
| 7,302,570 B2 | 11/2007 | Beard et al. |
| 7,340,508 B1 | 3/2008 | Kasi et al. |
| 7,409,707 B2 | 8/2008 | Swander et al. |
| 7,411,943 B2 | 8/2008 | Kittredge et al. |
| 7,415,010 B1 | 8/2008 | Croak et al. |
| 7,426,381 B2 | 9/2008 | Maes |
| 7,433,838 B2 | 10/2008 | Welsh et al. |
| 7,447,793 B2 | 11/2008 | Morioka |
| 7,454,399 B2 | 11/2008 | Matichuk |
| 7,461,062 B2 | 12/2008 | Stewart et al. |
| 7,472,349 B1 | 12/2008 | Srivastava et al. |
| 7,519,076 B2 | 4/2009 | Janssen et al. |
| 7,580,994 B1 | 8/2009 | Fiszman et al. |
| 7,617,521 B2 | 11/2009 | Maes |
| 7,630,953 B2 | 12/2009 | Stauber et al. |
| 7,676,813 B2 | 3/2010 | Bisset et al. |
| 7,716,310 B2 | 5/2010 | Foti |
| 7,752,634 B1 | 7/2010 | Saxena et al. |
| 7,779,445 B2 | 8/2010 | Ellis |
| 7,853,647 B2 | 12/2010 | Maes |
| 7,860,490 B2 | 12/2010 | Maes |
| 7,865,607 B2 | 1/2011 | Sonalkar et al. |
| 7,873,716 B2 | 1/2011 | Maes |
| 7,925,727 B2 | 4/2011 | Sullivan et al. |
| 8,023,971 B2 | 9/2011 | Egli |
| 8,032,920 B2 | 10/2011 | Maes |
| 8,068,860 B1 | 11/2011 | Midkiff |
| 8,073,810 B2 | 12/2011 | Maes |
| 8,090,848 B2 | 1/2012 | Maes |
| 8,161,171 B2 | 4/2012 | Maes |
| 8,214,503 B2 | 7/2012 | Maes |
| 8,230,449 B2 | 7/2012 | Maes |
| 2001/0028649 A1 | 10/2001 | Pogossiants et al. |
| 2002/0002684 A1 | 1/2002 | Fox et al. |
| 2002/0087674 A1 | 7/2002 | Guilford et al. |
| 2002/0099738 A1 | 7/2002 | Grant |
| 2002/0101879 A1 | 8/2002 | Bouret |
| 2002/0111848 A1 | 8/2002 | White |
| 2002/0143819 A1 | 10/2002 | Han et al. |
| 2002/0144119 A1 | 10/2002 | Benantar |
| 2002/0178122 A1 | 11/2002 | Maes |
| 2002/0184373 A1 | 12/2002 | Maes |
| 2002/0191774 A1 | 12/2002 | Creamer et al. |
| 2002/0194388 A1 | 12/2002 | Boloker et al. |
| 2002/0198719 A1 | 12/2002 | Gergic et al. |
| 2002/0198991 A1 | 12/2002 | Gopalakrishnan et al. |
| 2003/0003953 A1 | 1/2003 | Houplain |
| 2003/0004746 A1 | 1/2003 | Kheirolomoom et al. |
| 2003/0023953 A1 | 1/2003 | Lucassen et al. |
| 2003/0046316 A1 | 3/2003 | Gergic et al. |
| 2003/0061268 A1 | 3/2003 | Moerdijk et al. |
| 2003/0061404 A1 | 3/2003 | Atwal et al. |
| 2003/0115203 A1 | 6/2003 | Brown et al. |
| 2003/0115260 A1 | 6/2003 | Edge |
| 2003/0131076 A1 | 7/2003 | Nelson et al. |
| 2003/0140115 A1 | 7/2003 | Mehra |
| 2003/0140131 A1 | 7/2003 | Chandrashekhar et al. |
| 2003/0154233 A1 | 8/2003 | Patterson |
| 2003/0185233 A1 | 10/2003 | Ji et al. |
| 2003/0191769 A1 | 10/2003 | Crisan et al. |
| 2003/0208539 A1 | 11/2003 | Gildenblat et al. |
| 2003/0217044 A1 | 11/2003 | Zhang et al. |
| 2003/0229760 A1 | 12/2003 | Doyle et al. |
| 2003/0229812 A1 | 12/2003 | Buchholz |
| 2004/0015547 A1 | 1/2004 | Griffin et al. |
| 2004/0015578 A1 | 1/2004 | Karakashian et al. |
| 2004/0024720 A1 | 2/2004 | Fairweather |
| 2004/0064528 A1 | 4/2004 | Meredith et al. |
| 2004/0068586 A1 | 4/2004 | Xie et al. |
| 2004/0100923 A1 | 5/2004 | Yam |
| 2004/0110493 A1 | 6/2004 | Alvarez et al. |
| 2004/0125758 A1 | 7/2004 | Hayduk |
| 2004/0128546 A1 | 7/2004 | Blakley et al. |
| 2004/0139319 A1 | 7/2004 | Favazza et al. |
| 2004/0148334 A1 | 7/2004 | Arellano et al. |
| 2004/0153545 A1 | 8/2004 | Pandaya et al. |
| 2004/0161090 A1 | 8/2004 | Digate et al. |
| 2004/0176988 A1 | 9/2004 | Boughannam |
| 2004/0221005 A1 | 11/2004 | Albaugh et al. |
| 2005/0015340 A1 | 1/2005 | Maes |
| 2005/0021670 A1 | 1/2005 | Maes |
| 2005/0050194 A1 | 3/2005 | Honeisen et al. |
| 2005/0054287 A1 | 3/2005 | Kim |
| 2005/0073982 A1 | 4/2005 | Corneille et al. |
| 2005/0075115 A1 | 4/2005 | Corneille et al. |
| 2005/0086197 A1 | 4/2005 | Boubez et al. |
| 2005/0086297 A1 | 4/2005 | Hinks |
| 2005/0091156 A1 | 4/2005 | Hailwood et al. |
| 2005/0125696 A1 | 6/2005 | Afshar et al. |
| 2005/0132086 A1 | 6/2005 | Flurry et al. |
| 2005/0144557 A1 | 6/2005 | Li et al. |
| 2005/0172027 A1 | 8/2005 | Castellanos et al. |
| 2005/0193269 A1 | 9/2005 | Haswell et al. |
| 2005/0228984 A1 | 10/2005 | Edery et al. |
| 2005/0239485 A1 | 10/2005 | Kundu et al. |
| 2005/0249190 A1 | 11/2005 | Birch |
| 2005/0249344 A1 | 11/2005 | Mueller et al. |
| 2005/0267979 A1 | 12/2005 | Bailey |
| 2006/0014688 A1 | 1/2006 | Costa et al. |
| 2006/0021010 A1 | 1/2006 | Atkins et al. |
| 2006/0031559 A1 | 2/2006 | Sorokopud et al. |
| 2006/0036689 A1 | 2/2006 | Buford et al. |
| 2006/0041669 A1 | 2/2006 | Bemmel et al. |
| 2006/0053227 A1 | 3/2006 | Ye et al. |
| 2006/0072474 A1 | 4/2006 | Mitchell |
| 2006/0080117 A1 | 4/2006 | Carr et al. |
| 2006/0104306 A1 | 5/2006 | Adamczyk et al. |
| 2006/0104431 A1 | 5/2006 | Emery et al. |
| 2006/0116912 A1 | 6/2006 | Maes |
| 2006/0117109 A1 | 6/2006 | Maes |
| 2006/0143686 A1 | 6/2006 | Maes |
| 2006/0164902 A1 | 7/2006 | Fung |
| 2006/0165060 A1 | 7/2006 | Dua |
| 2006/0178898 A1 | 8/2006 | Habibi |
| 2006/0190600 A1 | 8/2006 | Blohm et al. |
| 2006/0210033 A1 | 9/2006 | Grech et al. |
| 2006/0212574 A1 | 9/2006 | Maes |
| 2006/0229078 A1 | 10/2006 | Itzkovitz et al. |
| 2006/0256774 A1 | 11/2006 | Rigaldies et al. |
| 2006/0272028 A1 | 11/2006 | Maes |
| 2006/0282856 A1 | 12/2006 | Errico et al. |
| 2006/0291507 A1 | 12/2006 | Sarosi et al. |
| 2007/0005770 A1 | 1/2007 | Kramer et al. |

(56) References Cited

U.S. PATENT DOCUMENTS

| | | |
|---|---|---|
| 2007/0011191 A1 | 1/2007 | Otokawa et al. |
| 2007/0011322 A1 | 1/2007 | Moiso |
| 2007/0027975 A1 | 2/2007 | Tai et al. |
| 2007/0061397 A1 | 3/2007 | Gregorat et al. |
| 2007/0088836 A1 | 4/2007 | Tai et al. |
| 2007/0100831 A1 | 5/2007 | Cox |
| 2007/0100981 A1 | 5/2007 | Adamczyk et al. |
| 2007/0112574 A1 | 5/2007 | Greene |
| 2007/0118618 A1 | 5/2007 | Kisel et al. |
| 2007/0118662 A1 | 5/2007 | Vishwanathan et al. |
| 2007/0150480 A1 | 6/2007 | Hwang et al. |
| 2007/0150936 A1 | 6/2007 | Maes |
| 2007/0182541 A1 | 8/2007 | Harris et al. |
| 2007/0192374 A1 | 8/2007 | Abnous et al. |
| 2007/0192465 A1 | 8/2007 | Modarressi |
| 2007/0197227 A1 | 8/2007 | Naqvi et al. |
| 2007/0201376 A1 | 8/2007 | Marshall-Wilson |
| 2007/0203841 A1 | 8/2007 | Maes |
| 2007/0204017 A1 | 8/2007 | Maes |
| 2007/0223462 A1 | 9/2007 | Hite et al. |
| 2007/0233883 A1 | 10/2007 | De Lutiis et al. |
| 2007/0239866 A1 | 10/2007 | Cox et al. |
| 2007/0271554 A1 | 11/2007 | Fletcher et al. |
| 2007/0276907 A1 | 11/2007 | Maes |
| 2007/0280226 A1 | 12/2007 | Sonalkar et al. |
| 2007/0291859 A1 | 12/2007 | Maes |
| 2008/0013533 A1 | 1/2008 | Bogineni et al. |
| 2008/0025243 A1 | 1/2008 | Corneille et al. |
| 2008/0037747 A1 | 2/2008 | Tucker |
| 2008/0080479 A1 | 4/2008 | Maes |
| 2008/0109853 A1 | 5/2008 | Einarsson et al. |
| 2008/0126541 A1 | 5/2008 | Rosenberg et al. |
| 2008/0127232 A1 | 5/2008 | Langen et al. |
| 2008/0151768 A1 | 6/2008 | Liu |
| 2008/0151918 A1 | 6/2008 | Foti |
| 2008/0155106 A1* | 6/2008 | Hans et al. .................... 709/227 |
| 2008/0162637 A1 | 7/2008 | Adamczyk et al. |
| 2008/0168523 A1 | 7/2008 | Ansari et al. |
| 2008/0175357 A1 | 7/2008 | Tucker |
| 2008/0186845 A1 | 8/2008 | Maes |
| 2008/0189401 A1 | 8/2008 | Maes |
| 2008/0201705 A1 | 8/2008 | Wookey |
| 2008/0228919 A1 | 9/2008 | Doshi et al. |
| 2008/0232567 A1 | 9/2008 | Maes |
| 2008/0235230 A1 | 9/2008 | Maes |
| 2008/0235327 A1 | 9/2008 | Maes et al. |
| 2008/0235354 A1 | 9/2008 | Maes |
| 2008/0235380 A1 | 9/2008 | Maes |
| 2008/0275883 A1 | 11/2008 | Ashraf et al. |
| 2008/0281607 A1 | 11/2008 | Sajja et al. |
| 2008/0288966 A1 | 11/2008 | Maes |
| 2008/0301135 A1 | 12/2008 | Alves et al. |
| 2008/0307108 A1 | 12/2008 | Yan et al. |
| 2009/0006360 A1 | 1/2009 | Liao et al. |
| 2009/0015433 A1 | 1/2009 | James et al. |
| 2009/0034426 A1 | 2/2009 | Luft et al. |
| 2009/0112875 A1 | 4/2009 | Maes |
| 2009/0119303 A1 | 5/2009 | Rio et al. |
| 2009/0125595 A1 | 5/2009 | Maes |
| 2009/0132717 A1 | 5/2009 | Maes |
| 2009/0187919 A1 | 7/2009 | Maes |
| 2009/0190603 A1 | 7/2009 | Damola et al. |
| 2009/0193057 A1 | 7/2009 | Maes |
| 2009/0193433 A1 | 7/2009 | Maes |
| 2009/0201917 A1 | 8/2009 | Maes et al. |
| 2009/0222541 A1 | 9/2009 | Monga et al. |
| 2009/0228584 A1 | 9/2009 | Maes et al. |
| 2009/0306834 A1 | 12/2009 | Hjelm et al. |
| 2009/0325561 A1* | 12/2009 | Xu et al. ........................ 455/416 |
| 2009/0328051 A1 | 12/2009 | Maes |
| 2010/0049640 A1 | 2/2010 | Maes |
| 2010/0049826 A1 | 2/2010 | Maes |
| 2010/0058436 A1 | 3/2010 | Maes |
| 2010/0070447 A1 | 3/2010 | Pfuntner et al. |
| 2010/0077082 A1 | 3/2010 | Hession et al. |
| 2010/0083285 A1 | 4/2010 | Bahat et al. |
| 2010/0185772 A1 | 7/2010 | Wang et al. |
| 2010/0192004 A1 | 7/2010 | Bauchot et al. |
| 2011/0125909 A1 | 5/2011 | Maes |
| 2011/0125913 A1 | 5/2011 | Maes |
| 2011/0126261 A1 | 5/2011 | Maes |
| 2011/0134804 A1 | 6/2011 | Maes |
| 2011/0142211 A1 | 6/2011 | Maes |
| 2011/0145278 A1 | 6/2011 | Maes |
| 2011/0145347 A1 | 6/2011 | Maes |
| 2011/0182205 A1 | 7/2011 | Gerdes et al. |
| 2011/0258619 A1 | 10/2011 | Wookey |
| 2012/0045040 A1 | 2/2012 | Maes |
| 2012/0047506 A1 | 2/2012 | Maes |
| 2012/0173745 A1 | 7/2012 | Maes |

OTHER PUBLICATIONS

Author Unknown, "Assuring Quality of Experience for IPTV—White Paper," Heavy Reading, Jul. 2006, 18 pages.

Author Unknown, "LTE Mobile Transport Evolution—Strategic White Paper," Alcatel Lucent, accessed Jan. 10, 2012 from http://lte.alcatel-lucent.com/locale/en_us/downloads/Alcatel-Lucent_LTE_Transport_WhitePaper.pdf, 2011, 16 pages.

Burger, E. et al., "Deploying CCXML for Application-Layer Call Control," Aug. 2006, 11 pages.

Dhesikan, "Quality of Service for IP Videoconferencing—Engineering White Paper," Cisco Systems, Jun. 1, 2001, 16 pages.

International Search Report and Written Opinion of PCT/US2010/037074 mailed Jun. 1, 2011, 16 pages.

Kim et al., "Implementation of Third Party Based Call Control using Parlay Network API in SIP Environment," ICOIN 2003, LNCS 2662, 2003, pp. 416-425.

Liberty Architecture Overview, Liberty Alliance Project Version 1.1, Piscataway New Jersey, Jan. 15, 2003, 44 pages.

Maes, Stephane, Multi-modal Browser Architecture, Overview on the support of multi-modal browsers in 3GPP, IBM Research Mobile Speech Solutions and Conversational Multi-modal Computing, http://www.w3.org, accessed May 26, 2003, 25 pages.

Maes, Stephane, Multi-modal Web IBM Position W3C/WAP Workshop, IBM Research Human Language Technologies, http://www.w3.org, accessed May 26, 2003, 9 pages.

Maretzke, Michael, "JAIN SLEE Technology Overview," <http://www.maretzke.de/pub/lectures/jslee_overview_2005/JSLEE_Overview_2005.pdf>, Apr. 12, 2005, 26 pages.

O'Doherty, Phelim, "JSLEE—SIP Servlet," <http://java.sun.com/products/jain/JSLEE-SIPServlet.pdf, 2003, 13 pages.

Parlay APIs 4.0, Parlay X Web Services White Paper, The Parlay Group, Parlay X Working Group, Dec. 16, 2002, 12 pages.

Policy-Based Management Tom Sheldon's Linktionary, http://www.linktionary.com/policy.html, accessed Aug. 2, 2004, 4 pages.

Romellini, C. et al., "CCXML: The Power of Standardization," Loquendo, Sep. 27, 2005, 7 pages.

Seely, Scott, "XML and Web Services Security: Understanding WS-Security," Microsoft Corporation, 2002, 11 pages.

Simpson et al., Java Product Review—Oracle EDA Suite, Dec. 4, 2006, Open Source Magazine, pp. 1-10.

Single Sign on Deployment Guide, Introduction to Single-Sign-On, Netscape 6 Documentation Training Manual http://developer.netscape.com/docs/manuals/security/SSO/sso.htm, accessed May 26, 2003, 5 pages.

Sundsted, Todd E., With Liberty and single sign-on for all, The Liberty Alliance Project seeks to solve the current online identity crisis Java World, downloaded www.javaworld.com/javaworld/jw-02-2002/jw-0215-liberty.html, accessed May 26, 2003, 7 pages.

The Parlay Group, "Specifications," <http://web.archive.org/web/20050114014707/www.parlay.org/specs/index.asp>, Jan. 14, 2005, 2 pages.

Thomas, Ann M., "Registering a Web Service in UDDI," SOA World Magazine, Sep. 26, 2003, 9 pages.

Wikipedia, "Object-Oriented Programming," <http://web.archive.org/web/20051211141918/http://en.wikipedia.org/wiki/Object-oriented_programming>, Dec. 11, 2005, 10 pages.

(56) References Cited

OTHER PUBLICATIONS

Wikipedia, "OSI model," <http://web.archive.org/web/20050907132012/http://en.wikipedia.org/wiki/Osi_model>, Sep. 7, 2005, 8 pages.

Wikipedia, "Parlay," <http://web.archive.org/web/20050130172632/en.wikipedia.org/wiki/Parlay>, Jan. 30, 2005, 3 pages.

U.S. Appl. No. 11/848,347, filed Aug. 31, 2007, Notice of Allowance mailed Mar. 2, 2012, 9 pages.

U.S. Appl. No. 11/848,347, filed Aug. 31, 2007, Advisory Action mailed May 23, 2011, 3 pages.

U.S. Appl. No. 11/848,347, filed Aug. 31, 2007, Final Office Action mailed Mar. 7, 2011, 21 pages.

U.S. Appl. No. 11/848,347, filed Aug. 31, 2007, Office Action mailed Sep. 30, 2010, 19 pages.

U.S. Appl. No. 11/848,347, filed Aug. 31, 2007, Advisory Action mailed Jul. 27, 2010, 3 pages.

U.S. Appl. No. 11/848,347, filed Aug. 31, 2007, Final Office Action mailed May 10, 2010, 15 pages.

U.S. Appl. No. 11/848,347, filed Aug. 31, 2007, Office Action mailed Oct. 29, 2009, 12 pages.

U.S. Appl. No. 11/877,129, filed Oct. 23, 2007, Advisory Action mailed Jun. 3, 2010, 2 pages.

U.S. Appl. No. 11/877,129, filed Oct. 23, 2007, Final Office Action mailed Mar. 29, 2010, 17 pages.

U.S. Appl. No. 11/877,129, filed Oct. 23, 2007, Notice of Allowance mailed Aug. 5, 2010, 6 pages.

U.S. Appl. No. 11/877,129, filed Oct. 23, 2007, Office Action mailed Sep. 28, 2009, 15 pages.

U.S. Appl. No. 11/926,738, filed Oct. 29, 2007, Advisory Action mailed May 25, 2011, 3 pages.

U.S. Appl. No. 11/926,738, filed Oct. 29, 2007, Final Office Action mailed Mar. 17, 2011, 13 pages.

U.S. Appl. No. 11/926,738, filed Oct. 29, 2007, Notice of Allowance mailed Aug. 5, 2011, 13 pages.

U.S. Appl. No. 11/926,738, filed Oct. 29, 2007, Office Action mailed Nov. 10, 2010, 12 pages.

U.S. Appl. No. 11/926,738, filed Oct. 29, 2007, Advisory Action mailed Sep. 3, 2010, 2 pages.

U.S. Appl. No. 11/926,738, filed Oct. 29, 2007, Final Office Action mailed Jun. 29, 2010, 12 pages.

U.S. Appl. No. 11/926,738, filed Oct. 29, 2007, Office Action mailed Feb. 24, 2010, 12 pages.

U.S. Appl. No. 11/943,101, filed Nov. 20, 2007, Advisory Action mailed Apr. 28, 2011, 3 pages.

U.S. Appl. No. 11/943,101, filed Nov. 20, 2007, Final Office Action mailed Feb. 14, 2011, 11 pages.

U.S. Appl. No. 11/943,101, filed Nov. 20, 2007, Notice of Allowance mailed Dec. 9, 2011, 7 pages.

U.S. Appl. No. 11/943,101, filed Nov. 20, 2007, Office Action mailed Jul. 28, 2011, 11 pages.

U.S. Appl. No. 11/943,101, filed Nov. 20, 2007, Advisory Action mailed Apr. 16, 2010, 3 pages.

U.S. Appl. No. 11/943,101, filed Nov. 20, 2007, Final Office Action mailed Feb. 2, 2010, 9 pages.

U.S. Appl. No. 11/943,101, filed Nov. 20, 2007, Office Action mailed Jul. 8, 2009, 11 pages.

U.S. Appl. No. 11/943,101, filed Nov. 20, 2007, Office Action mailed Aug. 27, 2010, 11 pages.

U.S. Appl. No. 11/951,500, filed Dec. 6, 2007, Advisory Action mailed Jul. 15, 2011, 3 pages.

U.S. Appl. No. 11/951,500, filed Dec. 6, 2007, Final Office Action mailed Apr. 14, 2011, 33 pages.

U.S. Appl. No. 11/951,500, filed Dec. 6, 2007, Office Action mailed Sep. 1, 2010, 30 pages.

U.S. Appl. No. 11/951,500, filed Dec. 6, 2007, Office Action mailed Apr. 11, 2012, 6 pages.

U.S. Appl. No. 11/951,500, filed Dec. 6, 2007, Notice of Allowance mailed Jul. 23, 2012, 7 pages.

U.S. Appl. No. 11/951,500, filed Dec. 6, 2007, Advisory Action mailed Jun. 24, 2010, 2 pages.

U.S. Appl. No. 11/951,500, filed Dec. 6, 2007, Final Office Action mailed Mar. 30, 2010, 26 pages.

U.S. Appl. No. 11/951,500, filed Dec. 6, 2007, Office Action mailed Sep. 22, 2009, 24 pages.

U.S. Appl. No. 10/855,999, filed May 28, 2004, Advisory Action dated Feb. 16, 2010, 3 pages.

U.S. Appl. No. 10/855,999, filed May 28, 2004, Advisory Action dated Feb. 2, 2009, 3 pages.

U.S. Appl. No. 10/855,999, filed May 28, 2004, Advisory Action dated Mar. 18, 2011, 3 pages.

U.S. Appl. No. 10/855,999, filed May 28, 2004, Final Office Action dated Jan. 5, 2011, 19 pages.

U.S. Appl. No. 10/855,999, filed May 28, 2004, Final Office Action dated Nov. 19, 2008, 12 pages.

U.S. Appl. No. 10/855,999, filed May 28, 2004, Final Office Action dated Nov. 23, 2009, 19 pages.

U.S. Appl. No. 10/855,999, filed May 28, 2004, Office Action dated Apr. 15, 2009, 13 pages.

U.S. Appl. No. 10/855,999, filed May 28, 2004, Office Action dated May 1, 2008, 9 pages.

U.S. Appl. No. 10/855,999, filed May 28, 2004, Office Action dated Jun. 24, 2010, 20 pages.

U.S. Appl. No. 10/856,588, filed May 28, 2004, Advisory Action dated Jan. 5, 2010, 3 pages.

U.S. Appl. No. 10/856,588, filed May 28, 2004, Final Office Action dated Oct. 15, 2008, 11 pages.

U.S. Appl. No. 10/856,588, filed May 28, 2004, Final Office Action dated Oct. 20, 2009, 17 pages.

U.S. Appl. No. 10/856,588, filed May 28, 2004, Notice of Allowance dated Sep. 23, 2010, 8 pages.

U.S. Appl. No. 10/856,588, filed May 28, 2004, Office Action dated Mar. 16, 2009, 10 pages.

U.S. Appl. No. 10/856,588, filed May 28, 2004, Office Action dated Apr. 11, 2008, 16 pages.

U.S. Appl. No. 11/070,317, filed Mar. 1, 2005, Advisory Action dated May 19, 2009, 3 pages.

U.S. Appl. No. 11/070,317, filed Mar. 1, 2005, Office Action dated Aug. 5, 2008, 18 pages.

U.S. Appl. No. 11/070,317, filed Mar. 1, 2005, Final Office Action dated Feb. 2, 2010, 8 pages.

U.S. Appl. No. 11/070,317, filed Mar. 1, 2005, Final Office Action dated Mar. 4, 2009, 16 pages.

U.S. Appl. No. 11/070,317, filed Mar. 1, 2005, Final Office Action dated Sep. 27, 2010, 8 pages.

U.S. Appl. No. 11/070,317, filed Mar. 1, 2005, Office Action dated Mar. 15, 2012, 10 pages.

U.S. Appl. No. 11/070,317, filed Mar. 1, 2005, Office Action dated Apr. 30, 2010, 9 pages.

U.S. Appl. No. 11/070,317, filed Mar. 1, 2005, Office Action dated Aug. 18, 2009, 21 pages.

U.S. Appl. No. 11/070,317, filed Mar. 1, 2005, Notice of Allowance dated Sep. 4, 2012, 52 pages.

U.S. Appl. No. 11/024,160, filed Dec. 27, 2004, Advisory Action dated Feb. 18, 2010, 3 pages.

U.S. Appl. No. 11/024,160, filed Dec. 27, 2004, Final Office Action dated Oct. 15, 2010, 11 pages.

U.S. Appl. No. 11/024,160, filed Dec. 27, 2004, Final Office Action dated Dec. 3, 2009, 11 pages.

U.S. Appl. No. 11/024,160, filed Dec. 27, 2004, Final Office Action dated Feb. 11, 2009, 9 pages.

U.S. Appl. No. 11/024,160, filed Dec. 27, 2004, Final Office Action dated Jun. 1, 2011, 11 pages.

U.S. Appl. No. 11/024,160, filed Dec. 27, 2004, Notice of Allowance dated Aug. 4, 2011, 15 pages.

U.S. Appl. No. 11/024,160, filed Dec. 27, 2004, Office Action dated Feb. 7, 2011, 11 pages.

U.S. Appl. No. 11/024,160, filed Dec. 27, 2004, Office Action dated Jun. 29, 2009, 9 pages.

U.S. Appl. No. 11/024,160, filed Dec. 27, 2004, Office Action dated Jun. 9, 2010, 10 pages.

(56) References Cited

OTHER PUBLICATIONS

U.S. Appl. No. 11/024,160, filed Dec. 27, 2004, Office Action dated Aug. 22, 2008, 8 pages.
U.S. Appl. No. 11/123,468, filed May 5, 2005, Advisory Action dated Jan. 18, 2011, 2 pages.
U.S. Appl. No. 11/123,468 filed May 5, 2005, Advisory Action dated Feb. 17, 2010, 3 pages.
U.S. Appl. No. 11/123,468, filed May 5, 2005, Final Office Action dated Nov. 10, 2010, 18 pages.
U.S. Appl. No. 11/123,468, filed May 5, 2005, Final Office Action dated Nov. 24, 2009, 19 pages.
U.S. Appl. No. 11/123,468, filed May 5, 2005, Office Action dated Apr. 10, 2009, 17 pages.
U.S. Appl. No. 11/123,468, filed May 5, 2005, Office Action dated Apr. 14, 2010, 16 pages.
U.S. Appl. No. 11/123,471, filed May 5, 2005, Notice of Allowance dated Jun. 29, 2009, 6 pages.
U.S. Appl. No. 11/123,471, filed May 5, 2005, Office Action dated Jan. 23, 2009, 8 pages.
U.S. Appl. No. 11/130,636, filed May 16, 2005, Notice of Allowance mailed Aug. 18, 2010, 4 pages.
U.S. Appl. No. 11/130,636, filed May 16, 2005, Office Action dated Mar. 23, 2010, 6 pages.
U.S. Appl. No. 11/130,636, filed May 16, 2005, Office Action dated Sep. 18, 2009, 13 pages.
U.S. Appl. No. 11/939,705, filed Nov. 14, 2007, Final Office Action mailed Mar. 16, 2011, 21 pages.
U.S. Appl. No. 11/939,705, filed Nov. 14, 2007, Office Action mailed Oct. 4, 2010, 21 pages.
U.S. Appl. No. 11/939,705, filed Nov. 14, 2007, Office Action mailed Sep. 28, 2011, 15 pages.
U.S. Appl. No. 11/939,705, filed Nov. 14, 2007, Final Office Action mailed Mar. 15, 2012, 16 pages.
U.S. Appl. No. 11/939,705, filed Nov. 14, 2007, Advisory Action mailed Jun. 1, 2012, 9 pages.
U.S. Appl. No. 11/939,705, filed Nov. 14, 2007, Office Action mailed Jul. 6, 2012, 13 pages.
U.S. Appl. No. 12/045,220, filed Mar. 10, 2008, Advisory Action dated May 31, 2012, 3 pages.
U.S. Appl. No. 12/045,220, filed Mar. 10, 2008, Final Office Action dated Mar. 15, 2012, 20 pages.
U.S. Appl. No. 12/045,220, filed Mar. 10, 2008, Advisory Action dated Jun. 11, 2010, 3 pages.
U.S. Appl. No. 12/045,220, filed Mar. 10, 2008, Final Office Action dated Apr. 2, 2010, 19 pages.
U.S. Appl. No. 12/045,220, filed Mar. 10, 2008, Office Action dated Oct. 2, 2009, 18 pages.
U.S. Appl. No. 12/045,220, filed Mar. 10, 2008, Office Action dated Sep. 27, 2011, 20 pages.
U.S. Appl. No. 12/019,335, filed Jan. 24, 2008, Advisory Action mailed Feb. 27, 2012, 3 pages.
U.S. Appl. No. 12/019,335, filed Jan. 24, 2008, Final Office Action mailed Dec. 5, 2011, 19 pages.
U.S. Appl. No. 12/019,335, filed Jan. 24, 2008, Office Action mailed May 23, 2011, 18 pages.
U.S. Appl. No. 12/364,642, filed Feb. 3, 2009, Advisory Action dated Sep. 16, 2011, 3 pages.
U.S. Appl. No. 12/364,642, filed Feb. 3, 2009, Final Office Action dated Jun. 19, 2012, 24 pages.
U.S. Appl. No. 12/364,642, filed Feb. 3, 2009, Final Office Action dated Jul. 1, 2011, 20 pages.
U.S. Appl. No. 12/364,642, filed Feb. 3, 2009, Office Action dated Oct. 18, 2011, 21 pages.
U.S. Appl. No. 12/364,642, filed Feb. 3, 2009, Office Action dated Dec. 20, 2010, 18 pages.
U.S. Appl. No. 12/364,642, filed Feb. 3, 2009, Advisory Action dated Sep. 14, 2012, 3 pages.
U.S. Appl. No. 12/364,642, filed Feb. 3, 2009, Notice of Allowance dated Nov. 14, 2012, 8 pages.
U.S. Appl. No. 11/357,653, filed Feb. 16, 2006, Final Office Action dated Sep. 21, 2012, 21 pages.
U.S. Appl. No. 11/357,653, filed Feb. 16, 2006, Office Action dated Apr. 26, 2012, 18 pages.
U.S. Appl. No. 11/357,653, filed Feb. 16, 2006, Advisory Action dated Oct. 12, 2011, 3 pages.
U.S. Appl. No. 11/357,653, filed Feb. 16, 2006, Final Office Action dated Aug. 2, 2011, 19 pages.
U.S. Appl. No. 11/357,653, filed Feb. 16, 2006, Office Action dated Jan. 20, 2011, 18 pages.
U.S. Appl. No. 12/544,459, filed Aug. 20, 2009, Notice of Allowance mailed Aug. 22, 2011, 8 pages.
U.S. Appl. No. 12/544,459, filed Aug. 20, 2009, Office Action mailed Mar. 2, 2011, 10 pages.
U.S. Appl. No. 12/544,471, filed Aug. 20, 2009, Office Action dated Jan. 6, 2012, 8 pages.
U.S. Appl. No. 12/544,471, filed Aug. 20, 2009, Final Office Action dated Jul. 30, 2012, 26 pages.
U.S. Appl. No. 12/544,484, filed Aug. 20, 2009, Advisory Action dated Feb. 9, 2012, 2 pages.
U.S. Appl. No. 12/544,484, filed Aug. 20, 2009, Final Office Action dated Dec. 1, 2011, 8 pages.
U.S. Appl. No. 12/544,484, filed Aug. 20, 2009, Office Action dated Jun. 3, 2011, 6 pages.
U.S. Appl. No. 12/490,540, filed Jun. 24, 2009, Office Action dated Jul. 6, 2012, 16 pages.
U.S. Appl. No. 11/949,930, filed Dec. 4, 2007, Notice of Allowance mailed Mar. 19, 2012, 19 pages.
U.S. Appl. No. 11/949,930, filed Dec. 4, 2007, Office Action mailed Sep. 29, 2011, 19 pages.
U.S. Appl. No. 11/969,343, filed Jan. 4, 2008, Advisory Action mailed Jan. 5, 2012, 3 pages.
U.S. Appl. No. 11/969,343, filed Jan. 4, 2008, Final Office Action mailed Oct. 21, 2011, 11 pages.
U.S. Appl. No. 11/969,343, filed Jan. 4, 2008, Office Action mailed Jun. 10, 2011, 13 pages.
U.S. Appl. No. 12/014,387, filed Jan. 15, 2008, Advisory Action mailed Jun. 15, 2012, 3 pages.
U.S. Appl. No. 12/014,387, filed Jan. 15, 2008, Final Office Action mailed Apr. 5, 2012, 17 pages.
U.S. Appl. No. 12/014,387, filed Jan. 15, 2008, Office Action mailed Sep. 7, 2011, 18 pages.
U.S. Appl. No. 12/018,718, filed Jan. 23, 2008, Final Office Action mailed Feb. 1, 2012, 30 pages.
U.S. Appl. No. 12/018,718, filed Jan. 23, 2008, Office Action mailed Jun. 22, 2011, 23 pages.
U.S. Appl. No. 12/019,299, filed Jan. 24, 2008, Advisory Action dated Dec. 9, 2010, 3 pages.
U.S. Appl. No. 12/019,299, filed Jan. 24, 2008, Final Office Action mailed Oct. 6, 2010, 20 pages.
U.S. Appl. No. 12/019,299, filed Jan. 24, 2008, Final Office Action mailed Aug. 25, 2011, 20 pages.
U.S. Appl. No. 12/019,299, filed Jan. 24, 2008, Office Action mailed Jan. 24, 2011, 16 pages.
U.S. Appl. No. 12/019,299, filed Jan. 24, 2008, Advisory Action mailed Nov. 3, 2011, 2 pages.
U.S. Appl. No. 12/019,299, filed Jan. 24, 2008, Office Action mailed Feb. 16, 2012, 18 pages.
U.S. Appl. No. 12/019,299, filed Jan. 24, 2008, Office Action mailed Mar. 31, 2010, 13 pages.
U.S. Appl. No. 12/019,299, filed Jan. 24, 2008, Final Office Action mailed Aug. 15, 2012, 19 pages.
U.S. Appl. No. 12/948,247, filed Nov. 17, 2010, Office Action mailed Jul. 6, 2012, 14 pages.
U.S. Appl. No. 12/791,129, filed Jun. 1, 2010, Office Action mailed Jul. 10, 2012, 14 pages.
U.S. Appl. No. 13/416,413, filed Mar. 9, 2012, Office Action mailed Apr. 27, 2012, 11 pages.
U.S. Appl. No. 13/416,413, filed Mar. 9, 2012, Notice of Allowance mailed Oct. 2, 2012, 5 pages.

* cited by examiner

INTER-WORKING WITH A WALLED GARDEN FLOOR-CONTROLLED SYSTEM

The present application claims benefit under 35 USC 119 (e) of U.S. Provisional Application No. 61/262,781, filed on Nov. 19, 2009 by Maes et al. and entitled "Inter-Working with a Walled Garden Floor-Controlled System," of which the entire disclosure is incorporated herein by reference for all purposes.

BACKGROUND OF THE INVENTION

Embodiments of the present invention relate generally to methods and systems for inter-working between disparate communication networks and more particularly to inter-working between a walled garden service such as a push-to-talk service and a communication session outside of the walled garden service or between different floor control systems.

There are many standardized as well as proprietary examples of push-to-talk (PTT) systems including push-to-talk-over-cellular (POC) systems. For example, there are well-known cellular services that provide a walkie-talkie-like function to the cellular phone or device. These services allow two or more subscribers to participate in a conference in which a party can push a button to talk to the other participants in the conference. These systems can also perform floor control for the conference. That is, when one participant in the conference pushes the button to talk, that participant is granted control of the floor and the other participants are muted or otherwise prevented from talking.

Most of these PTT services are walled garden services. That is, these services are open only to subscribers of that service and/or service provider or a set of cooperating service providers. The same can be said of proprietary voice chat or PTT systems that can only be used with a client provided for or by the system for users that are therefore on the corresponding private IM/multimedia messaging system. Similarly, other types of multimedia services can provide floor control such as in a PTT system but also are open only to subscribers of that service and/or service provider or a set of cooperating service providers.

In some cases, the service provider may make the service available to another operator but generally require that operator to implement the (same) service provider's proprietary solution(s). However, none of these services are open to clients other than those specifically adapted to operation on the network or the proprietary clients of the network. For example, there are a variety of clients such as multimedia clients, chat clients, Voice Over Internet Protocol (VOIP) clients, etc. that can operate on Session Initiation Protocol (SIP) or another signaling protocol and can support similar features but are not adapted to operate with a PTT or POC network or session or to work with other IM networks that offer voice chat or other multimedia service. There are no current solutions to allow such a client to participate in a session on another network with a walled garden, floor controlled system or service. Hence, there is a need for improved methods and systems for inter-working with a walled garden, floor-controlled system service, e.g., between a push-to-talk service and a communication session outside of the walled garden service, between different walled garden PTT systems, between different proprietary IM/multimedia systems offering floor controlled services a la push to talk or voice chat, etc.

BRIEF SUMMARY OF THE INVENTION

Embodiments of the invention provide systems and methods for inter-working with a walled garden, floor-controlled system or service. For example, inter-working can be provided or supported between a walled-garden push-to-talk (PTT) service and a communication session outside of the walled garden service, between different walled garden PTT systems, between different proprietary IM/multimedia systems offering floor controlled services a la push to talk or voice chat, etc. According to one embodiment, a system can comprise a first communication network adapted to provide a walled garden (or proprietary) service and support a first communication session of the walled garden service and a second communication network adapted to support a second communication session. The second communication session can occur outside of the walled garden service. The system can also include an inter-working service communicatively coupled with the first communication network and the second communication network. The inter-working service can be adapted to provide an interface between the first communication session and the second communication session.

The inter-working service can be adapted to participate in the first communication session as a client of the walled garden service and participate in the second communication session as a client of the second communication session. For example, the walled garden service can comprise a Push-To-Talk (PTT) service, or a Push-to-talk-Over-Cellular (POC) service. The second network can comprise an Internet Protocol (IP) network. In such cases, the second session can comprise a Voice Over Internet Protocol (VOIP) session, a voice chat session, or another type of session including but not limited to voice and/or multimedia.

The system can further comprise a first set of clients communicatively coupled with the first communications network and a second set of clients communicatively coupled with the second communications network. The first set of clients can be adapted to participate in the first communication session with the inter-working service and the second set of clients can be adapted to participate in the second communication session with the inter-working service. In one exemplary use, the inter-working service can be further adapted to receive an invitation from a client of the first set of clients for a client of the second set of clients to participate in the first communication session, authorize the invitation, invite the client of the second set of clients to participate in the first communication session, receive an acceptance from the client of the second set of clients, and establish a connection between the first communication session and the client of the second set of clients. The invitation from the client of the first set of clients can identify the client of the second set of clients. For example, the invitation from the client of the first set of clients can identify the client of the second set of clients based on shared presence information. Establishing a connection between the first communication session and the client of the second set of clients can comprise negotiating codecs between the client of the first set of clients and the client of the second set of clients and/or performing media conversion between the first communication session and the client of the second set of clients.

In another exemplary use, the inter-working service can be additionally or alternatively adapted to receive an invitation from a client of the second set of clients for a client of the first set of clients to participate in the second communication session, authorize the invitation, invite the client of the first set of clients to participate in the second communication session, receive an acceptance from the client of the first set of clients, and establish a connection between the second communication session and the client of the first set of clients. The invitation from the client of the second set of clients can identify the client of the first set of clients. For example, the invitation from the client of the second set of clients can identify the client of the first set of clients based on shared presence information. Establishing a connection between the second communication session and the client of the first set of clients can comprise negotiating codecs between the client of the first set of clients and the client of the second set of clients and/or performing media conversion between the second communication session and the client of the first set of clients. In either example, the inter-working service can be further adapted to perform floor control for the first communication session and the second communication session.

According to another embodiment, a method of inter-working with a walled garden service can comprise participating in a first communication session. The first communication session can comprise a session of the walled garden service and participating in the first communication session can comprise participating as a client of the walled garden service. The method can also include participating in a second communication session. The second communication session can be outside of the walled garden service and participating in the second communication session can comprise participating as a client of the second communication session. For example, the walled garden service can comprise a Push-To-Talk (PTT) service, or a Push-to-talk-Over-Cellular (POC) service. The second session can comprise a Voice Over Internet Protocol (VOIP) session, a voice chat session, or another type of session.

In one exemplary use, an invitation can be received from a client of the first communication session for a client of the second communication session to participate in the first communication session. The invitation from the client of the first communication session can identify the client of the second communication session. For example, the invitation from the client of the first communication session can identify the client of the second communication session based on shared presence information. The invitation can be authorized and the client of the second communication session can be invited to participate in the first communication session. An acceptance can be received from the client of the second communication session and a connection can be established between the first communication session and the client of the second communication session. Establishing a connection between the first communication session and the client of the second communication session can comprise negotiating codecs between the client of the first communication session and the client of the second communication session and/or performing media conversion between the first communication session and the client of the second communication session.

In another exemplary use, an invitation can be received from a client of the second communication session for a client of the first communication session to participate in the second communication session. The invitation from the client of the second communication session can identify the client of the first communication session. For example, the invitation from the client of the second communication session can identify the client of the first communication session based on shared presence information. The invitation can be authorized and the client of the first communication session can be invited to participate in the second communication session. An acceptance from the client of the first communication session can be received and a connection between the second communication session and the client of the first communication session can be established. Establishing a connection between the second communication session and the client of the first communication session can comprise negotiating codecs between the client of the first communication session and the client of the second communication session and/or performing media conversion between the second communication session and the client of the first communication session. In either example, floor control can be performed for the first communication session and the second communication session.

According to yet another embodiment, a machine-readable medium can have stored thereon a series of instruction which, when executed by a processor, cause the processor to provide inter-working with a walled garden service by participating in a first communication session, wherein the first communication session comprises a session of the walled garden service and participating in the first communication session comprises participating as a client of the walled garden service, and participating in a second communication session, wherein the second communication session is outside of the walled garden service and participating in the second communication session comprises participating as a client of the second communication session.

DETAILED DESCRIPTION OF THE INVENTION

Figure 1:
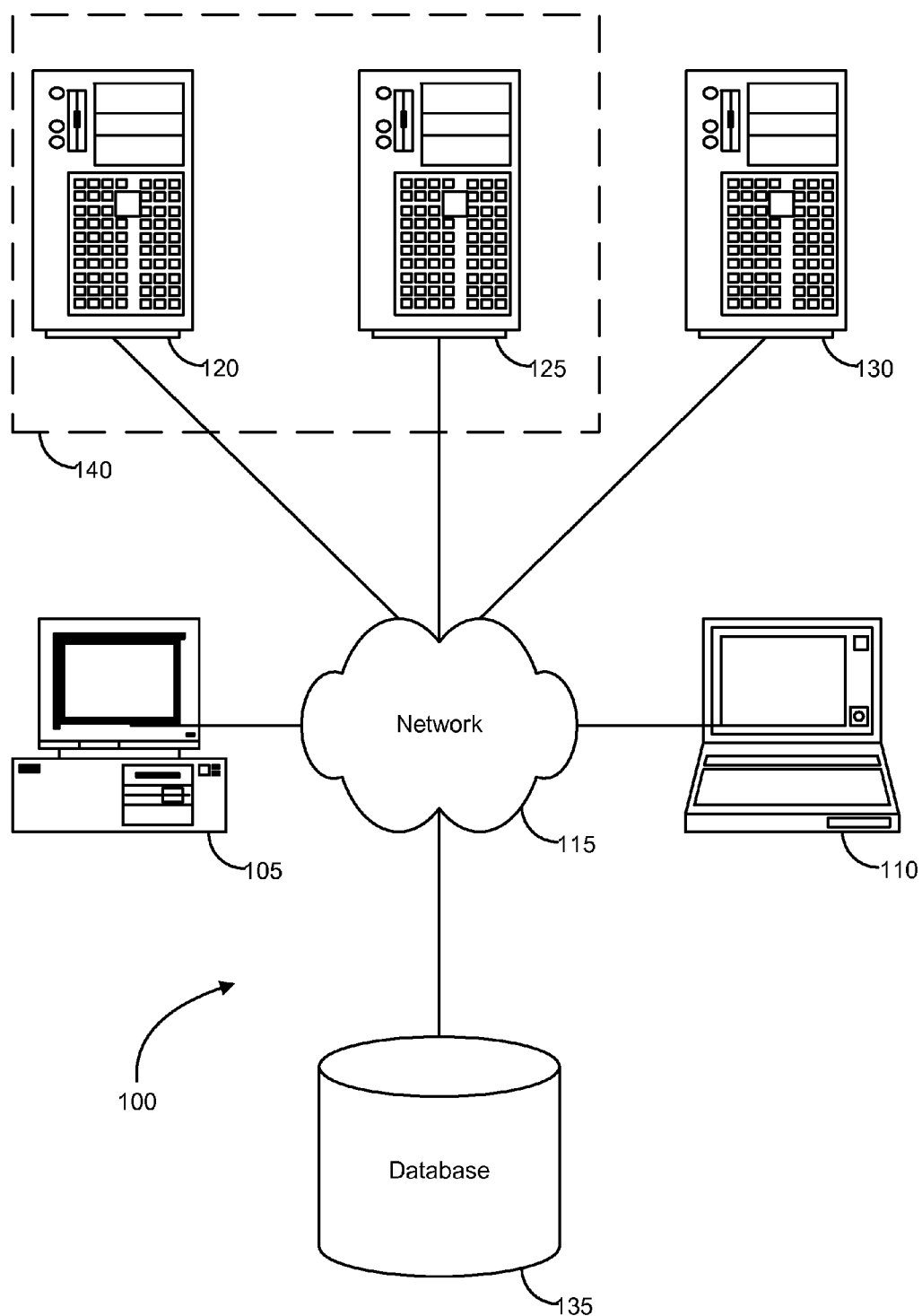
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof When implemented in software, firmware, middleware or microcode, the program code or code segments to perform the necessary tasks may be stored in a machine readable medium. A processor(s) may perform the necessary tasks.

Embodiments of the invention provide systems and methods for inter-working between a walled garden, floor-controlled system or service and another communication session or client outside of the walled garden system. According to one embodiment, an inter-working service is provided. The inter-working service can provide an interface or gateway between a network or system supporting a first communication session such as a PTT session, for example, and a network or system supporting a second communication session, e.g., other than the PTT session. As will be seen, the first session can have one or more clients participating in the first session while the second session can have one or more other clients participating in the second session. For example, the second session can comprise a voice chat or other session occurring on another IP system or network. The clients participating in the second session can comprise any of a variety of clients including but not limited to voice chat clients, multimedia clients, Voice Over Internet Protocol (VOIP) clients, SIP/SIMPLE, XMPP (or other proprietary IM/Multimedia networks), etc.

Generally speaking, the inter-working service provides an interface or gateway between the first session and the second session by appearing as an appropriate client to each session. For example, assuming the first session is a PTT session and the second session is a voice chat session, the inter-working service can participate in the PTT session as a PTT client and participate in the voice chat session as a voice chat client. Further, the inter-working service can interact with other clients of each session as the same type of client, e.g., the inter-working service can interact as a PTT client with participants in the PTT session while interacting as a voice chat client with the participants in the voice chat session. In this way, the participants in each session appear through the inter-working service to be a client of the appropriate type to participants in the other session. Therefore, the voice chat clients and the PTT clients can interact with each other via the inter-working service as if they were other clients of the same type. It should be understood that, while described herein with reference to voice communication session such as PTT or POC, embodiments of the present invention are not limited to PTT or POC or even voice communication sessions. Rather, embodiments of the present invention provide for interworking between any two disparate systems that have floor control and allow multimedia messaging. For example, embodiments of the present invention can also include voice or video conferencing systems, even PSTN-based conferencing, where a media server can provide floor control. Various additional details of embodiments of the present invention will be described below with reference to the figures.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10 g, that is adapted to store, update, and retrieve data in response to SQL-formatted commands.

Figure 2:
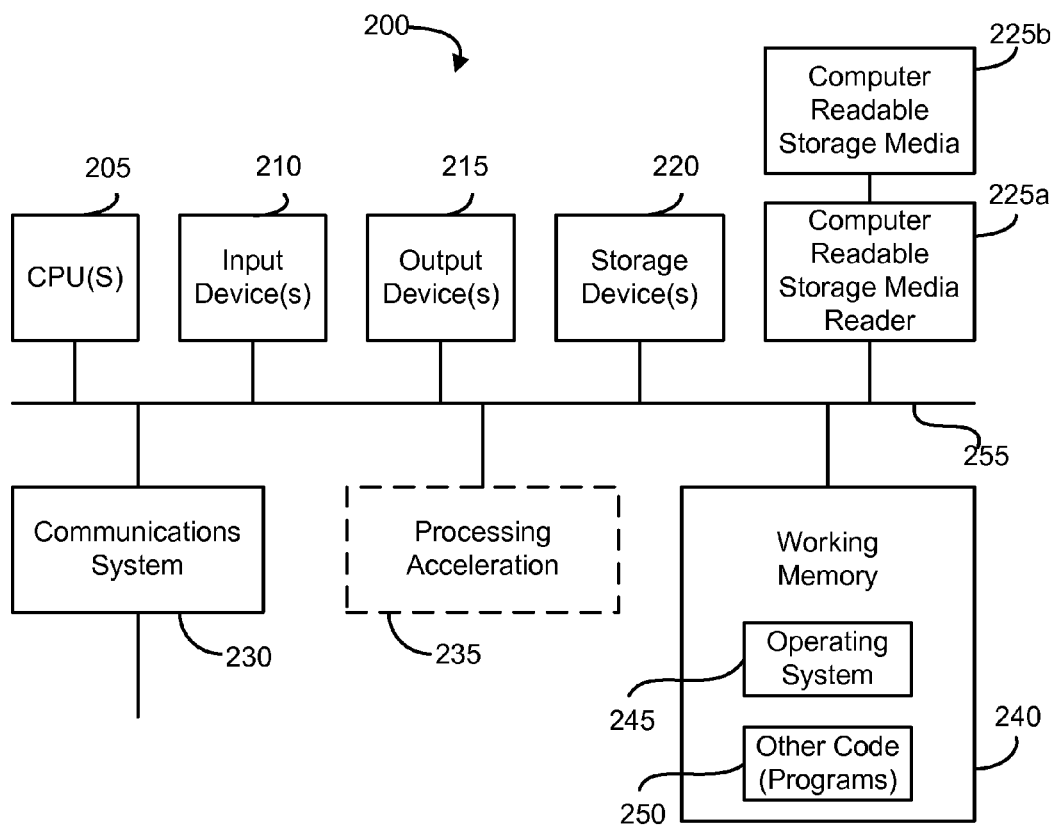
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3A:
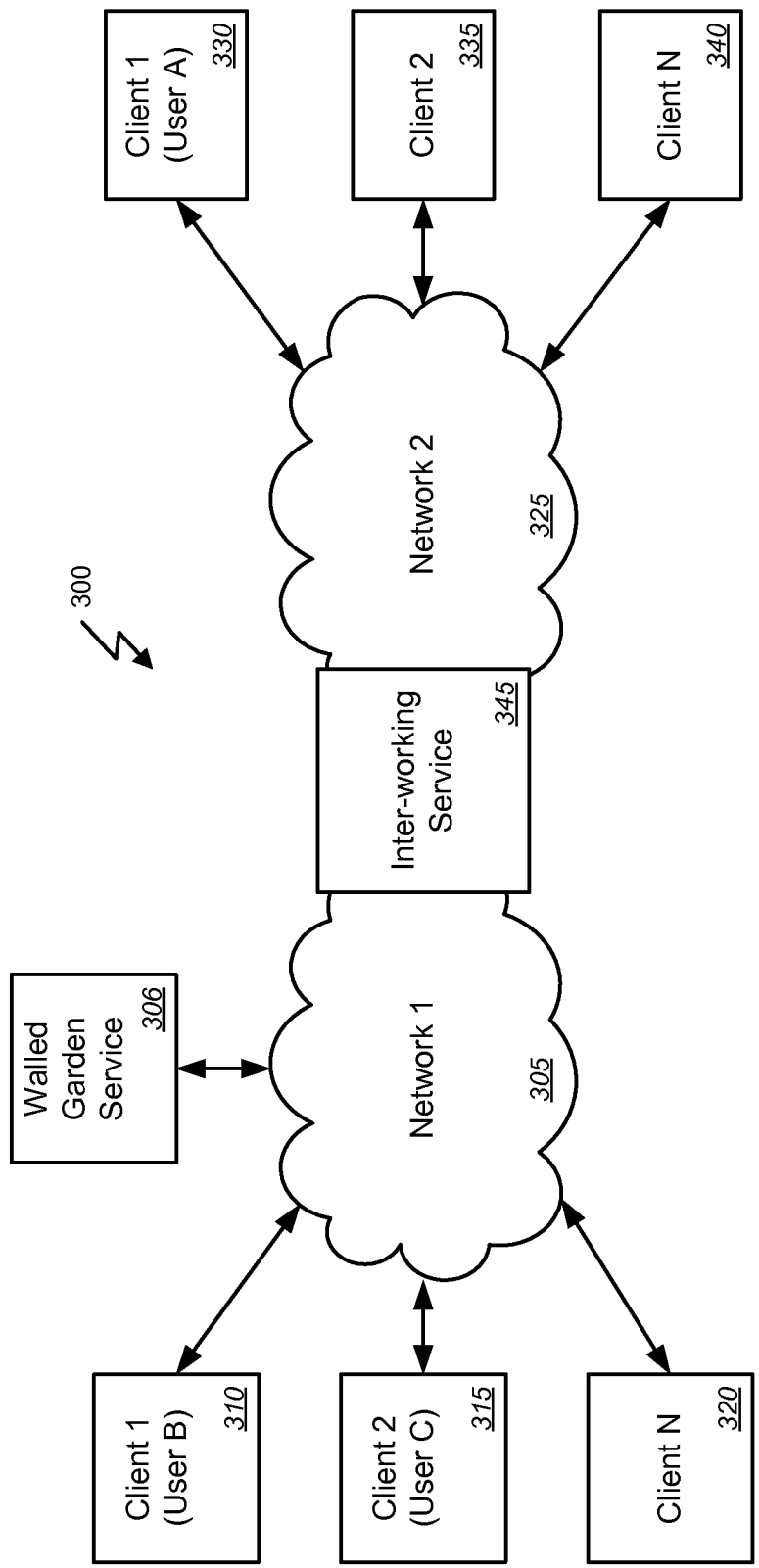
FIG. 3A is a block diagram illustrating, at a high-level, functional components of a system for inter-working with a walled garden floor-controlled system according to one embodiment of the present invention.

FIG. 3A is a block diagram illustrating, at a high-level, functional components of a system for inter-working with a walled garden floor-controlled system according to one embodiment of the present invention. In this example, the system 300 includes a first communication network 305 such as a wired or wireless LAN, WAN, or other network such as described above. The first communication network 305 can be adapted to provide or support a walled garden service 306. A number of clients 310-320 can be communicatively coupled with the first communication network 305. The clients 310-320 coupled with the first communication network 305 can be adapted to participate in a first communication session such as such as may be supported by a walled garden service 306.

The system 300 can also include a second communication network 325 such as a wired or wireless LAN, WAN, Internet, intranet, or other network such as described above. A number of clients 330-340 can be communicatively coupled with the second communication network 325. The clients 330-340 coupled with the second communication network 325 can be adapted to participate in a second communication session supported by the second communication network 325 but separate and different from the first communication session supported by the walled garden service 306, i.e., the second communication session is "outside" of the walled garden service 306.

The system 300 can also include an inter-working service 345 communicatively coupled with the first communications network 305 and the second communications network 325. As noted above, the inter-working service 345 can provide an interface or gateway between the first communication network 305 the second communication network 325. As such, the inter-working service 345 also provides an interface or a gateway between the first communication session on the first network 305 and the second communication session on the second network 325. More specifically, the inter-working service 345 provides an interface or a gateway between the first communication session and the second communication session by appearing as an appropriate client to each session. For example, assuming the first session is a PTT session and the second session is a voice chat session, the inter-working service 345 can participate in the (first) PTT session as a PTT client and participate in the (second) voice chat session as a voice chat client. Further, the inter-working service 345 can interact with other clients of each session as the same type of client, i.e., the inter-working service 345 can interact as a PTT client with participants in the PTT session while interacting as a voice chat client with the participants in the voice chat session. In this way, the participants in each session appear through the inter-working service 345 to be a client of the appropriate type to participants in the other session. It should be understood that inter-working service 345 and/or the functions performed thereby can be implemented in hardware, software, or a combination thereof and can provide other translation, transcoding, and other functions as appropriate to allow the networks and the elements of the different systems to connect and communicate, i.e., exchange media.

According to one embodiment, the walled garden service 306 can be adapted to perform floor control. Via the inter-working service 345, the floor control functions of the walled garden service 306 can be extended to the clients 330-340 of the second network 325 participating in the communication session through the interworking service 345. For example, User B 310 can obtain or be given control of the floor, for example as a moderator or initiator of the session. The stream from User A 330 to Users B and C 310 and 315 can be muted or withheld by the inter-working service 345. If User A 330 speaks while muted, Users B and C do not hear it. Additionally or alternatively, if User A speaks while muted, the inter-working service may prompt that the line is muted. According to yet another alternative, when User A 330 speaks, the voice can buffered and the inter-working service 345 can request the floor for User A 330 (e.g. based on speech/activity detection). User A 330 may be made aware (via background noise) that he does not have floor but may loose what he says if speaks too long.

When user A 330 wants the floor, he may have to enter a request for floor (e.g. a particular DTMF signal like #5). When floor control is granted, User A 330 may hear a prompt "mute off" or a particular beep produced by the inter-working service 345. When User A 330 has the floor, his media can be passed (possibly with conversion) to Users B and C 310 and 315 as if coming from a POC user. When another user is granted control of the floor, User A 330 can be muted or withheld by the inter-working service 345. User A 330 may be informed of this with a prompt "mute on" or a particular beep produced by the inter-working service 345. Upon completion, the POC session can terminate or User A may leave the session. Thus, the clients 330-340 of the second network 325 as represented by the inter-working service 345 in the first communication session on the first network 305 appear to the clients 310-320 of the first network to be clients or users of the first network 305 rather than from another, i.e., the second, network. Therefore, it is possible to have one network, multimedia system, or multimedia conferencing system not able to provide floor control capabilities and still be able to provide floor control when interoperating with the first system through the inter-working service 345 so that the first system believes that the users on the second system are part of same network and comply to the behaviour of the system.

As noted above, different types of networks 305 and 325, clients 310-320 and 330-340 and services 306 can be supported by an inter-working service 345 as described herein. For example, in one implementation as illustrated in the following example and described with reference to FIG. 3B, the walled garden service 306 can comprise a Push-To-Talk (PTT) service, or a Push-to-talk-Over-Cellular (POC) service. The second network 325 can comprise an Internet Protocol (IP) network. In such cases, the second session can comprise a Voice Over Internet Protocol (VOIP) session, a voice chat session, or another type of session including but not limited to voice and/or multimedia. However, it should be understood that the following exemplary implementation is provided only for illustrative purposes and should not be considered exclusive or limiting on the scope of the present invention. Rather, embodiments of the present invention while described herein with reference to voice communication session such as PTT or POC, embodiments of the present invention are not limited to PTT or POC or even voice communication sessions. Rather, embodiments of the present invention provide for interworking between any two disparate systems that have floor control and allow multimedia messaging. For example, embodiments of the present invention can also include voice or video conferencing systems, even PSTN-based conferencing, where a media server can provide floor control.

Figure 3B:
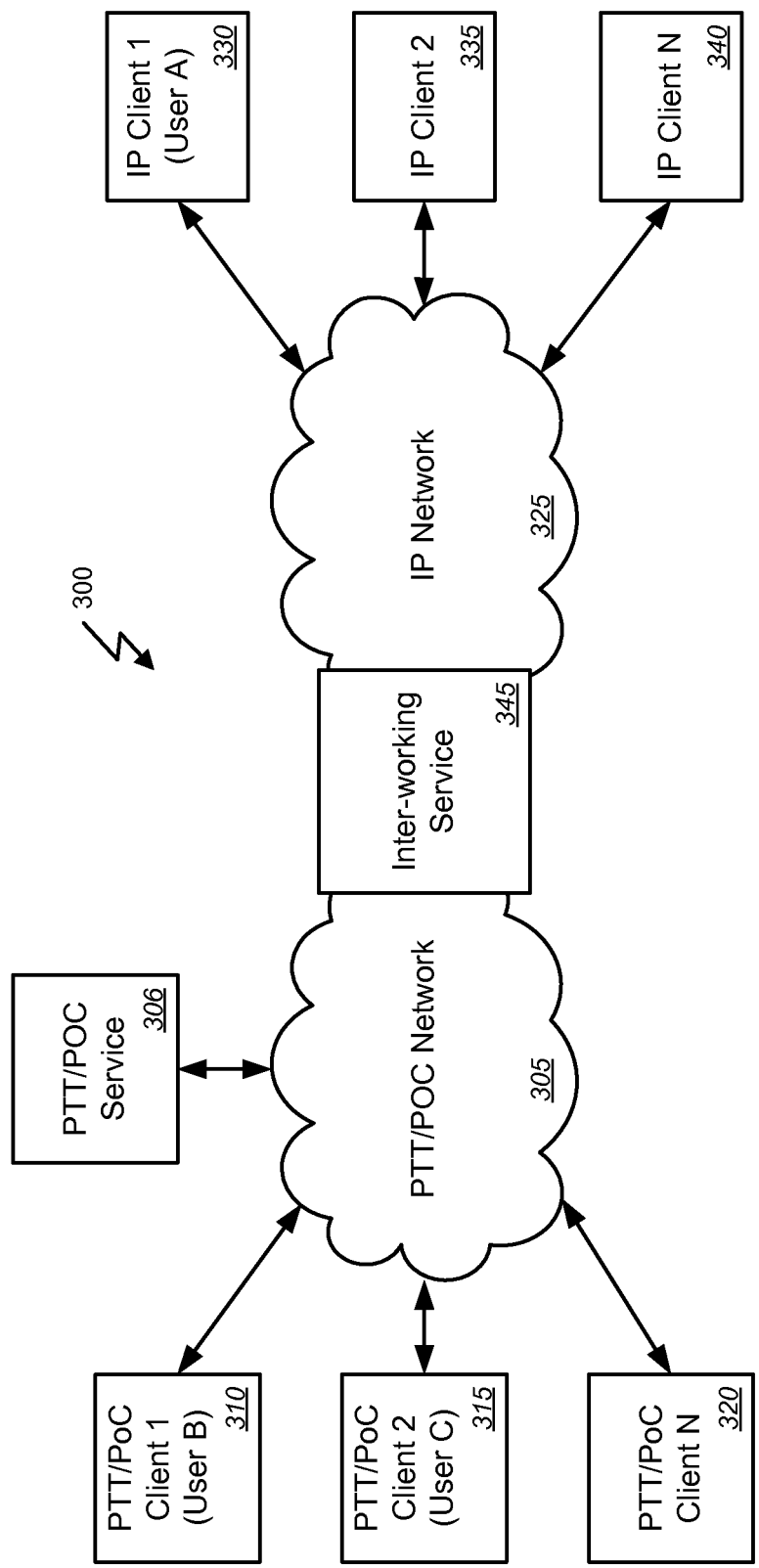
FIG. 3B is a block diagram illustrating additional details of an exemplary implementation of the system of FIG. 3A according to one embodiment of the present invention.

FIG. 3B is a block diagram illustrating additional details of an exemplary implementation of the system of FIG. 3A according to one embodiment of the present invention. In this example, the system 300 includes a first communication network 305 such as a wired or wireless LAN, WAN, or other network such as described above. In this example, the first communication network 305 can be adapted to provide or support a walled garden service such as a PTT and/or POC service 306. For example, the service may comprise an OMA POC service. A number of PTT and/or POC clients 310-320 can be communicatively coupled with the first communication network 305. The clients 310-320 coupled with the first communication network 305 can be adapted to participate in a communication session, i.e., a PTT or POC session of the PTT and/or POC service 306.

The system 300 can also include a second communication network 325 such as a wired or wireless LAN, WAN, Internet, intranet, or other network such as described above. In this example, the second communication network 325 can be adapted to provide or support communications via Internet Protocol (IP) or other protocol. A number of IP clients 330-340 can be communicatively coupled with the second communication network 325. The IP clients 330-340 coupled with the second communication network 325 can be adapted to participate in a communication session such as a voice chat or other session supported by the second communication network 325.

The system 300 can also include an inter-working service 345 communicatively coupled with the first communications network 305 and the second communications network 325. As noted above, the inter-working service 345 can provide an interface or gateway between a network or system supporting a PTT session, i.e., the first communication network 305, and a network or system supporting a second communication session other than a PTT session, i.e., the second communication network 325. The inter-working service 345 provides an interface or a gateway between the first session and the second session by appearing as an appropriate client to each session. For example, assuming the first session is a PTT session and the second session is a voice chat session, the inter-working service 345 can participate in the PTT session as a PTT client and participate in the voice chat session as a voice chat client. Further, the inter-working service 345 can interact with other clients of each session as the same type of client, i.e., the inter-working service 345 can interact as a PTT client with participants in the PTT session, i.e., clients 310-320, while interacting as a voice chat client with the participants in the voice chat session, i.e., clients 330-340. In this way, the participants in each session appear through the inter-working service 345 to be a client of the appropriate type to participants in the other session. Therefore, the voice chat clients 330-340 and the PTT clients 310-320 can interact with each other via the inter-working service 345 as if they were other clients of the same type.

More specifically, a voice chat system such as may be implemented on or supported by communications network 325 can allow peer-to-peer or conference-based full duplex voice interactions between the clients 330-340 that may be participating in a session. Such a session may be implemented via Session Initiation Protocol (SIP), Real-time Transport Protocol (RTP) or other protocol including but not limited to eXtensible Messaging and Presence Protocol (XMPP), proprietary protocols a la Skype, MSN messenger, Yahoo messenger, AIM, Google Talk, etc. If implemented in via SIP, a registrar and SIP proxy can be available to appropriately route SIP messages or be provided in equivalent ways with, for example, an IMS network. The voice chat clients 330-340 need not provide services like group management and floor control.

For the purpose of the following discussion, one of the clients 330 ("User A") coupled with the IP network 325 can comprise a voice chat client. Two of the clients 310 and 315 ("User B" and "User C") can comprise POC clients and may be mobile. In one example, User B 310 may want to establish a POC session with User C 315 and invite User A 330 to the POC session while maintaining, from the point of view of Users B and C 310 and 3115, a POC user experience. It can be assumed that User B 310 knows the SIP address (or other identifier) of User A 330. In such a case, User B 310 can invite User A 330 via the identifier to join the session/form a new group. In some cases, this may be based on shared presence information, i.e., the presence of User A 330 is known to POC presence or attributes (status, preference, address, etc.) point to an internet/intranet address. The invitation can be routed to the inter-working service 345 where it may be authorized (e.g., charging, privacy purposes, etc.). The inter-working service 345 can invite the voice chat client of User A 330 on the IP network 325 (e.g., via 3$^{rd}$ party call control, or using the inter-working service 345 as an intermediary). User A 330 can accept the invitation and a session can be established via the inter-working service 345 with the POC session between User B 310 and User C 315, i.e., they can exchange the type of media of the system. If the media formats are different, the inter-working service 345 can be adapted to trans-code the media formats and, in cases, may perform protocol translations. In some cases, acceptance may be automated. Codecs may be negotiated between the POC clients 310 and 315 and the voice chat client 330. Otherwise the inter-working service 345 may provide media conversion between the POC codecs and the voice chat codec.

As a result, the POC session can remain in progress and the voice chat client 330 can participate in it. The inter-working service 345 can emulate User A 330 as a virtual POC user for Users B and C 310 and 315 and it can emulate Users B and C 310 and 315 as voice chat users for User A 330. When User B 310 has control of the floor, the stream from User A 330 to Users B and C 310 and 315 can be muted or withheld by the inter-working service 345. If User A 330 speaks while muted, Users B and C do not hear it. Additionally or alternatively, if User A speaks while muted, the inter-working service may prompt that the line is muted. According to yet another alternative, when User A 330 speaks, the voice can buffered and the inter-working service 345 can request the floor for User A 330 (e.g. based on speech/activity detection). User A 330 may be made aware (via background noise) that he does not have floor but may loose what he says if speaks too long.

When user A 330 wants the floor, he may have to enter a request for floor (e.g. a particular DTMF signal like #5). When floor control is granted, User A 330 may hear a prompt "mute off" or a particular beep produced by the inter-working service 345. When User A 330 has the floor, his media can be passed (possibly with conversion) to Users B and C 310 and 315 as if coming from a POC user. When another user is granted control of the floor, User A 330 can be muted or withheld by the inter-working service 345. User A 330 may be informed of this with a prompt "mute on" or a particular beep produced by the inter-working service 345. Upon completion, the POC session can terminate or User A may leave the session.

In another exemplary use, User A 330 wants to chat with Users B and C 310 and 315 who are part of a POC group that he is authorized to contact (via an appropriate group address). In this case, User A 330 may be authorized to establish a session with User B 310 because User A 330 has a POC account associated to his internet/intranet identity and is member of a POC group with Users B and C 310 and 315 or because Users B and C 310 and 315 are reachable from the intranet domain (or second domain). In any event, User A 330 can invites User B 310 via the identifier to join a voice chat. The invitation can be routed to the inter-working service 345 where it may be authorized (privacy, policies, possibility to charge User A 330 or domain of User A 330 for this or possibility to charge User B 310 for the internet chat etc). The inter-working service 345 can invite User B to join a POC session with User A 330. Again, this may be based on shared presence information, i.e., the presence of User B 310 may be know by User A presence server or attributes (status, preference, address, etc.) point to an internet/intranet address. Alternatively, User A 330 can call into a POC session where User B 310 and User C 315 are using an identifier, phone number, or address to call in, i.e., instead of calling directly a user or set of users. In either case, codec negotiation or conversion, floor control, session completion etc. may take place analogous to that described above.

It should be understood that various alternative implementations may be utilized without departing from the scope of the present invention. For example, voice can be replaced by any media available in POC and on the internet/intranet, e.g., video, provided both have equivalent (not necessarily same) media capabilities. In another example, User A 330 may be in a conference (i.e. mixer with its own floor control) with other internet/intranet users and the conference "joins" the POC session (with global floor or per user floor (e.g. via cascaded floor control and mixing). In yet another example, User A 330 or other users may be on another network (say XX), conferenced via a XXtoSIP gateway). XX may be another VoIP network or a PSTN network. Other POC features could also be similarly emulated at the level of the inter-working service 345.

The embodiment described above is a "gateway-like" behavior. However, it should also be understood that another approach could be considered (e.g. proxy-like behavior with new voice chat client emulating POC client behavior etc) without departing from the scope of the present invention. It should be noted however that this is a workable approach to satisfy inter-working with a base SIP/VoIP network (without any additional capabilities, besides support for SIP routing to SIP address). Such an approach can provide support for proprietary floor controlled systems and remote POC networks. Indeed, a possible approach would be to define a complete POC/SIP inter-working service and task another network to also inter-work with SIP.

Stated another way, a system 300 can comprise a first communication network 305 adapted to provide a walled garden service and support a first communication session of the walled garden service and a second communication network 325 adapted to support a second communication session. The second communication session can occur outside of the walled garden service and/or first network. In other implementations, the sessions can occur across IM systems that are different systems or different providers as well as PSTN to IM or POC, or with PSTN or PSTN conference, or even between conferences. The system 300 can also include an inter-working service 345 communicatively coupled with the first communication network 305 and the second communication network 325. The inter-working service 345 can be adapted to provide an interface between the first communication session and the second communication session.

The inter-working service 345 can be adapted to participate in the first communication session as a client of the walled garden service and participate in the second communication session as a client of the second communication session. For example, the walled garden service can comprise a Push-To-Talk (PTT) service, or a Push-to-talk-Over-Cellular (POC) service. The second network 325 can comprise an Internet Protocol (IP) network. In such cases, the second session can comprise a Voice Over Internet Protocol (VOIP) session, a voice chat session, or another type of session.

The system 300 can further comprise a first set of clients 310-320 communicatively coupled with the first communications network 305 and a second set of clients 330-340 communicatively coupled with the second communications network 325. The first set of clients 310-320 can be adapted to participate in the first communication session with the inter-working service 345 and the second set of clients 330-340 can be adapted to participate in the second communication session with the inter-working service 345. In one exemplary use, the inter-working service 345 can be further adapted to receive an invitation from a client 310 of the first set of clients 310-320 for a client 330 of the second set of clients 330-340 to participate in the first communication session, authorize the invitation, invite the client 330 of the second set of clients 330-340 to participate in the first communication session, receive an acceptance from the client 330 of the second set of clients 330-340, and establish a connection between the first communication session and the client 330 of the second set of clients 330-340. The invitation from the client 310 of the first set of clients 310-320 can identify the client 330 of the second set of clients 330-340. For example, the invitation from the client 310 of the first set of clients 310-320 can identify the client 330 of the second set of clients 330-340 based on shared presence information. Establishing a connection between the first communication session and the client of the second set of clients can comprise negotiating codecs between the client 310 of the first set of clients 310-320 and the client 330 of the second set of clients 330-340 and/or performing media conversion between the first communication session and the client 330 of the second set of clients 330-340.

In another exemplary use, the inter-working service 345 can be additionally or alternatively adapted to receive an invitation from a client 330 of the second set of clients 330-340 for a client 310 of the first set of clients 310-320 to participate in the second communication session, authorize the invitation, invite the client 310 of the first set of clients 310-320 to participate in the second communication session, receive an acceptance from the client 310 of the first set of clients 310-320, and establish a connection between the second communication session and the client 310 of the first set of clients 310-320. The invitation from the client 330 of the second set of clients 330-340 can identify the client 310 of the first set of clients 310-320. For example, the invitation from the client 330 of the second set of clients 330-340 can identify the client 310 of the first set of clients 310-320 based on shared presence information. Establishing a connection between the second communication session and the client 310 of the first set of clients 310-320 can comprise negotiating codecs between the client 310 of the first set of clients 310-320 and the client 330 of the second set of clients 330-340 and/or performing media conversion between the second communication session and the client 310 of the first set of clients 310. In either example, the inter-working service 345 can be further adapted to perform floor control for the first communication session and the second communication session.

In yet another embodiment, the inter-working service 345 can be additionally or alternatively adapted to receive a request from a client 330 of the second set of clients 330-340 for the client 330 to join a session between clients 310 and 315 of the first set of clients 310-320. In such a case, the inter-working service 345 can be adapted to authorize the request, request the clients 310 315 of the first set of clients 310-320 to allow the requesting client 330 to participate in the communication session, receive an acceptance from one or more of the clients 310 and 315 of the first set of clients 310-320, and establish a connection between the communication session and the requesting client 330. Establishing a connection between the second communication session and the client 310 of the first set of clients 310-320 can comprise negotiating codecs between the client 310 of the first set of clients 310-320 and the client 330 of the second set of clients 330-340 and/or performing media conversion between the second communication session and the client 310 of the first set of clients 310. In either example, the inter-working service 345 can be further adapted to perform floor control for the first communication session and the second communication session.

Figure 4:
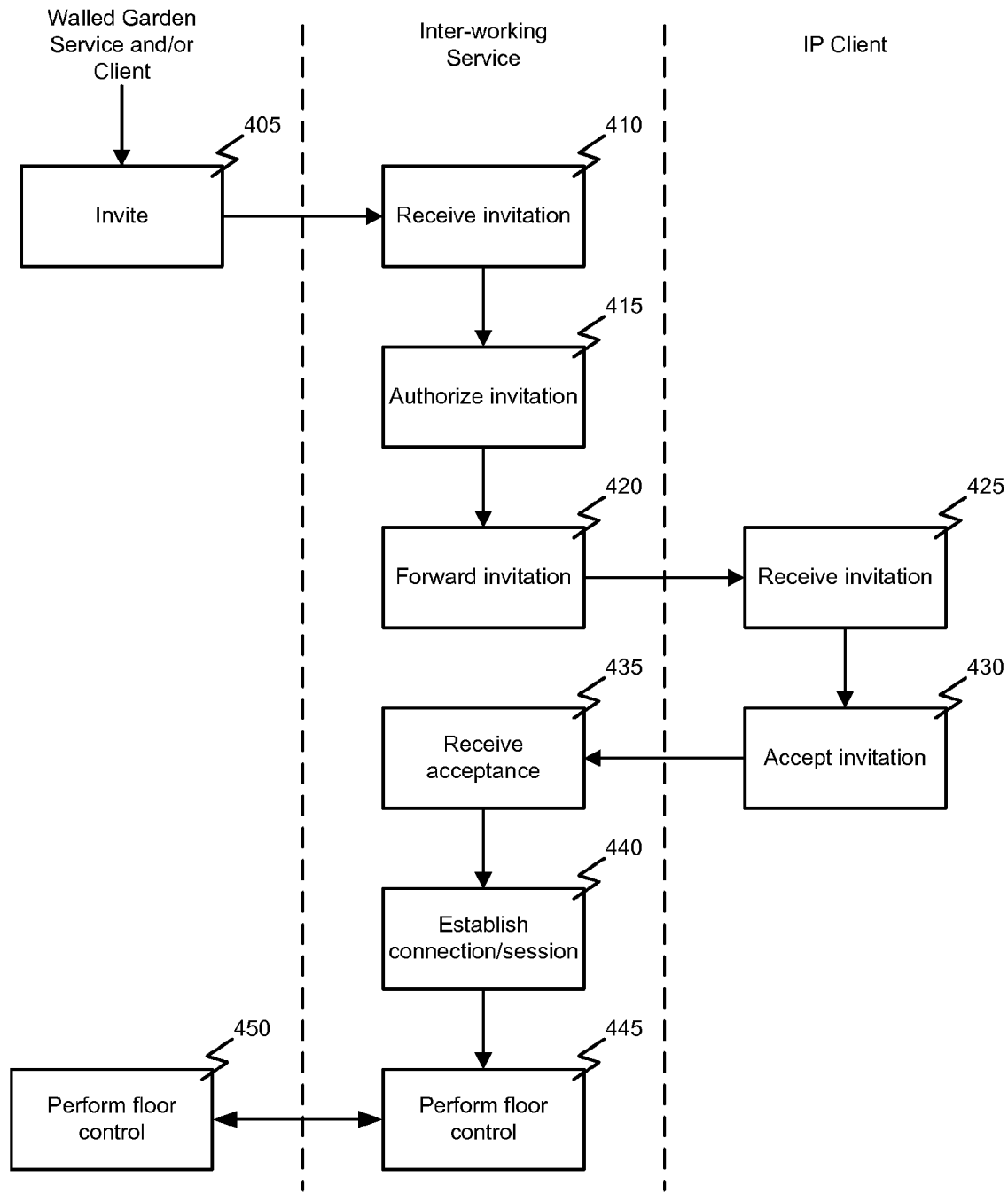
FIG. 4 is a flowchart illustrating a process for inter-working with a walled garden floor-controlled service according to one embodiment of the present invention.

FIG. 4 is a flowchart illustrating a process for inter-working with a walled garden floor-controlled service according to one embodiment of the present invention. More specifically, this example illustrates the exemplary use described above in which User B invites User A to participate in a session of the walled garden service. In this example, a client of the first communication session, i.e., User B, can send 405 an invitation for a client of a second communication session, i.e., User A, to participate in the first communication session. The invitation from the client of the first communication session can identify the client of the second communication session. For example, the invitation from the client of the first communication session can identify the client of the second communication session based on shared presence information.

The invitation from the client of the first communication session can be received 410 by the inter-working service. The invitation can be authorized 415 and the client of the second communication session can be invited 420 to participate in the first communication session. The client of the second communication session can in turn receive 425 and accept 430 the invitation.

The inter-working service can receive 435 the acceptance from the client of the second communication session and establish 440 a connection between the first communication session and the client of the second communication session. Establishing 440 a connection between the first communication session and the client of the second communication session can comprise negotiating codecs between the client of the first communication session and the client of the second communication session and/or performing media conversion between the first communication session and the client of the second communication session.

According to one embodiment, the inter-working service and walled garden service can, once the session has been established 440, perform floor control 445 and 450 as noted above. That is, the walled garden service can be adapted to perform floor control. Via the inter-working service, the floor control functions of the walled garden service can be extended to the clients of the second network participating in the communication session through the interworking service. As described above, the clients of the second network as represented by the inter-working service in the first communication session on the first network appear to the clients of the first network to be clients or users of the first network rather than from another, i.e., the second, network. Therefore, it is possible to have one network, multimedia system, or multimedia conferencing system not able to provide floor control capabilities and still be able to provide floor control when interoperating with the first system, i.e., the walled garden system or other system providing floor control, through the inter-working service so that the first system believes that the users on the second system are part of same network and comply to the behaviour of the system.

Figure 5:
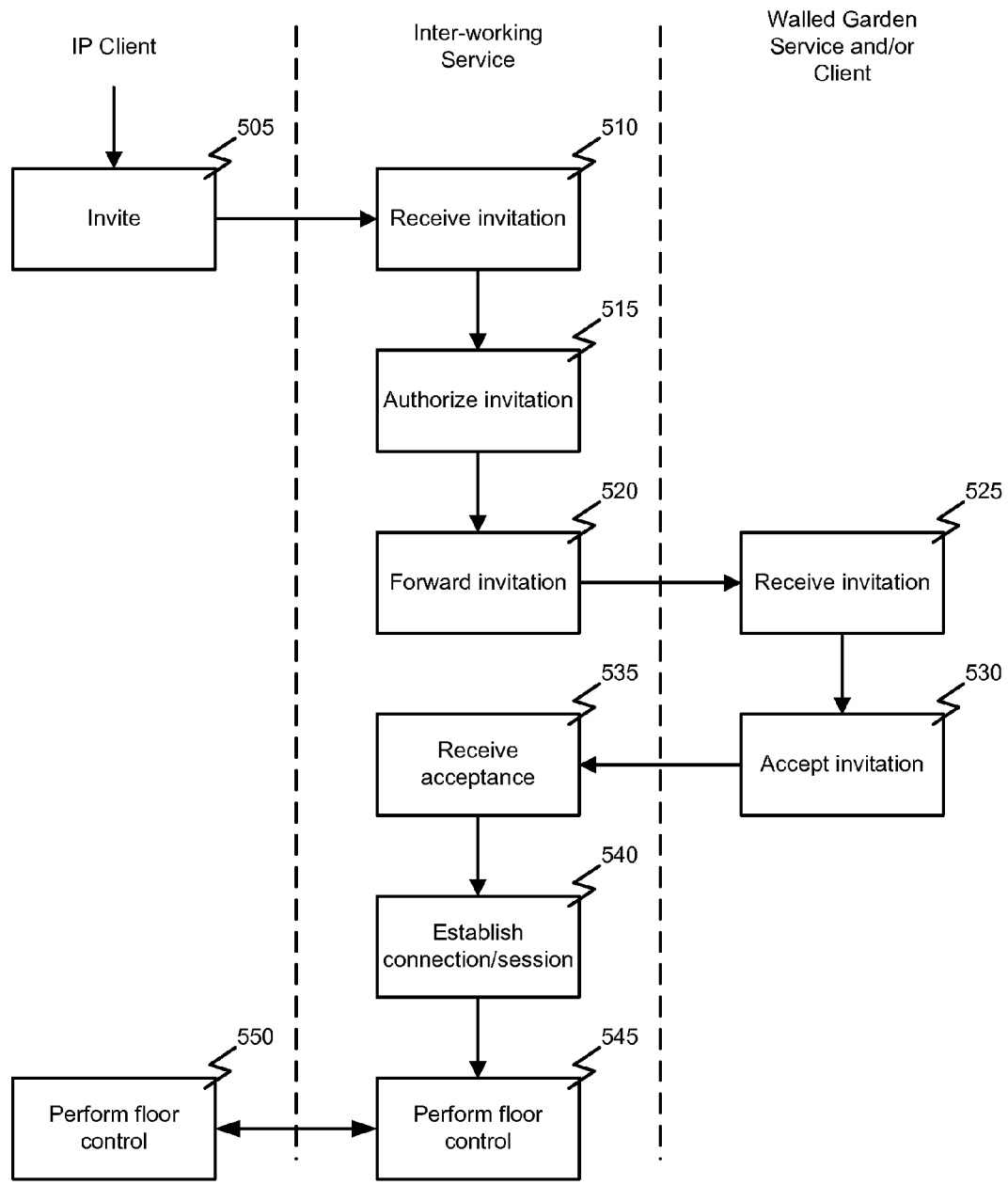
FIG. 5 is a flowchart illustrating a process for inter-working with a walled garden floor-controlled service according to an alternative embodiment of the present invention.

FIG. 5 is a flowchart illustrating a process for inter-working with a walled garden floor-controlled service according to an alternative embodiment of the present invention. More specifically, this example illustrates the exemplary use described above in which User A invites User B to participate in a session. In this example, a client of the second communication session, i.e., User A, can send 505 an invitation for a client of a second communication session, i.e., User B, to participate in the second communication session. The invitation from the client of the second communication session can identify the client of the first communication session. For example, the invitation from the client of the second communication session can identify the client of the first communication session based on shared presence information.

The invitation can be received 510 from the client of the second communication session for a client of the first communication session to participate in the second communication session. The invitation can be authorized 515 and the client of the first communication session can be invited 520 to participate in the second communication session. The client of the first communication session can in turn receive 525 and accept 530 the invitation.

The inter-working service can receive 535 the acceptance from the client of the first communication session and establish 540 a connection between the second communication session and the client of the first communication session. Establishing 540 a connection between the second communication session and the client of the first communication session can comprise negotiating codecs between the client of the first communication session and the client of the second communication session and/or performing media conversion between the second communication session and the client of the first communication session.

According to one embodiment, the inter-working service and walled garden service can, once the session has been established 540, perform floor control 545 and 550 as noted above. That is, the walled garden service can be adapted to perform floor control. Via the inter-working service, the floor control functions of the walled garden service can be extended to the clients of the second network participating in the communication session through the interworking service. As described above, the clients of the second network as represented by the inter-working service in the first communication session on the first network appear to the clients of the first network to be clients or users of the first network rather than from another, i.e., the second, network. Therefore, it is possible to have one network, multimedia system, or multimedia conferencing system not able to provide floor control capabilities and still be able to provide floor control when interoperating with the first system, i.e., the walled garden system or other system providing floor control, through the inter-working service so that the first system believes that the users on the second system are part of same network and comply to the behaviour of the system.

Figure 6:
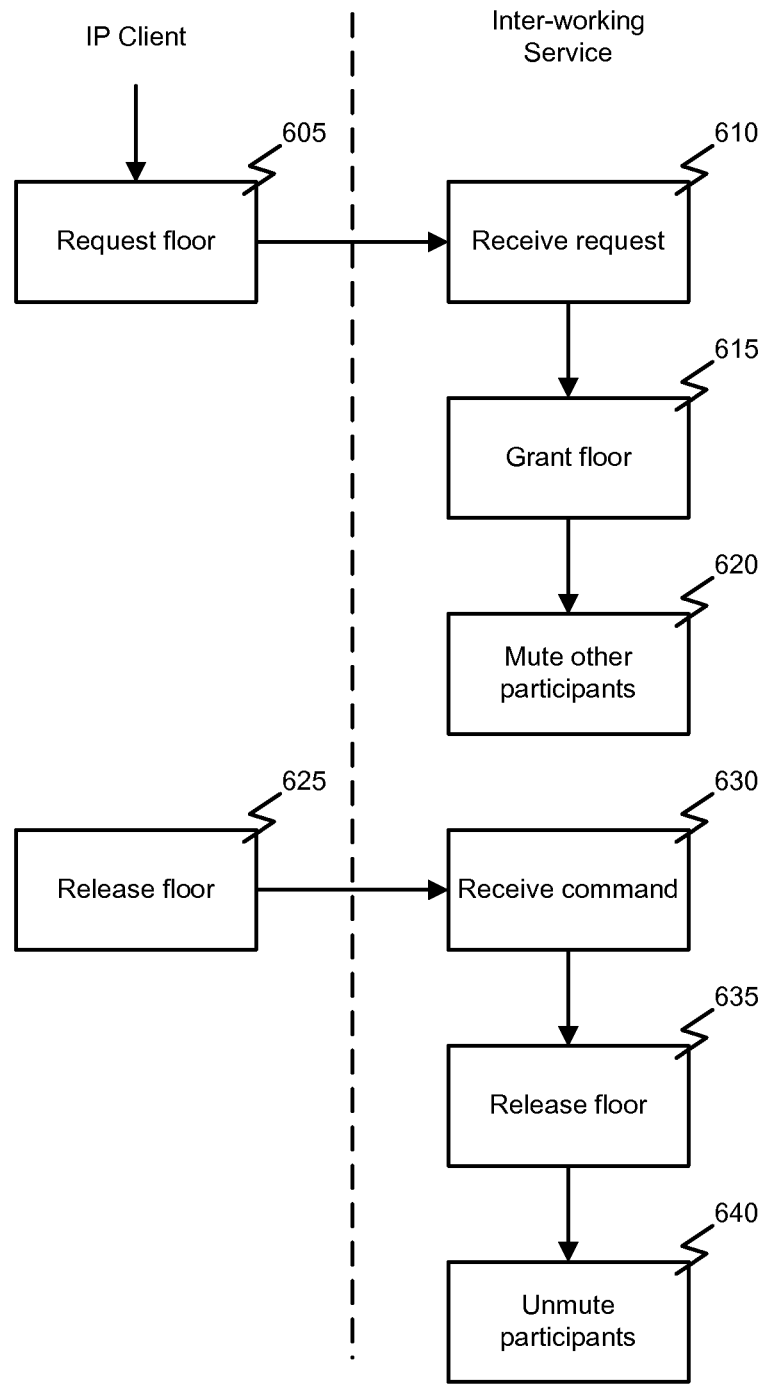
FIG. 6 is a flowchart illustrating a process for performing floor-control according to an embodiment of the present invention.

FIG. 6 is a flowchart illustrating a process for performing floor-control according to an embodiment of the present invention. In this example, processing begins with one of the participating clients requesting 605 the floor. For example, the participant may request the floor through a DTMF command or other means. The inter-working service can receive 610 the request, grant 615 the floor, if available to the requesting participant, and mute 620 the other participants.

Once the participant decides to relinquish the floor, the client can release 625 the floor. For example, the participant may release the floor through a DTMF command or other means. The inter-working service can receive 630 the command, release 635 the floor or make the floor available to other participants, and unmute 640 the other participants.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A system comprising:
a first communication network adapted to provide a walled garden service and support a first communication session of the walled garden service;
a first plurality of client devices communicatively coupled with the first communications network and adapted to participate in the first communication session;
a second communication network adapted to support a second communication session, wherein the second communication session occurs outside of the walled garden service;
a second plurality of client devices communicatively coupled with the second communications network and adapted to participate in the second communication session;
a computer system executing an inter-working service communicatively: the computer system coupled with the first communication network and the second communication network, wherein the inter-working service is adapted to participate in the first communication session as a client of the walled garden service and participate in the second communication session as a client of the second communication session, the inter-working service adapted to provide an interface between the first communication session and the second communication session;
wherein the inter-working service is further adapted to receive an invitation from a client of the first plurality of client devices for a client of the second plurality of client devices to participate in the first communication session, authorize the invitation, invite the client of the second plurality of client devices to participate in the first communication session, receive an acceptance from the client of the second plurality of client devices, and establish a connection between the first communication session and the client of the second plurality of client devices; and
wherein establishing a connection between the first communication session and the client of the second plurality of client devices comprises negotiating codecs between the client of the first plurality of client devices and the client of the second plurality of client devices.

2. The system of claim 1, wherein the walled garden service comprises a Push-To-Talk (PTT) service or a Push-to-talk-Over-Cellular (POC) service.

3. The system of claim 2, wherein the second network comprises a Public Switched Telephone Network (PSTN) or an Internet Protocol (IP) network.

4. The system of claim 3, wherein the second communication session comprises one of a conference, a Voice Over Intermit Protocol (VoIP) session, an Instant Messaging (IM) session, an Instant Messaging (IM) multimedia session, and a voice chat session.

5. The system of claim 1, wherein the first communication network and the second communication network are implemented on different technologies or are provided by different service providers.

6. The system of claim 1, wherein the invitation from the client of the first plurality of clients identifies the client of the second plurality of clients.

7. The system of claim 6, wherein the invitation from the client of the first plurality of clients identifies the client of the second plurality of clients based on shared presence information.

8. The system of claim 1, wherein establishing a connection between the first communication session and the client of the second plurality of clients comprises performing media conversion between the first communication session and the client of the second plurality of clients.

9. The system of claim 1, wherein the inter-working service is further adapted to receive an invitation from a client of the second se~ plurality of clients for a client of the first plurality of clients to participate in the second communication session, authorize the invitation, invite the client of the first plurality of clients to participate in the second communication session, receive an acceptance from the client of the first plurality of clients, and establish a connection between the second communication session and the client of the first plurality of clients.

10. The system of claim 9, wherein the invitation from the client of the second plurality of clients identifies the client of the first plurality of clients.

11. The system of claim 10, wherein the invitation from the client of the second plurality of clients identifies the client of the first plurality of clients based on shared presence information.

12. The system of claim 9, wherein establishing a connection between the second communication session and the client of the first plurality of clients comprises negotiating codecs between the client of the first plurality of clients and the client of the second plurality of clients.

13. The system of claim 9, wherein establishing a connection between the second communication session and the client of the first plurality of clients comprises performing media conversion between the second communication session and the client of the first plurality of clients.

14. The system of claim 10, wherein the walled garden service is further adapted to provide floor control functions for the first communication session.

15. The system of claim 14, wherein the inter-working service is adapted to provide the floor control functions to the second communication session.

16. A method for interworking with a walled garden service, the method comprising:
executing by a computer system an inter-working service, the computer system coupled with a first communication network and a second communication network, the first communication network adapted to provide a walled garden service and support a first communication session of the walled garden service between a first plurality of client devices, the second communication network adapted to support a second communication session between a second plurality of client devices, wherein the second communication session occurs outside of the walled garden service;
participating, by the computer system with the inter-working service, in the first communication session as a client of the walled garden service;
participating, by the computer system with the inter-working service, in the second communication session as a client of the second communication session;
providing, by the computer system with the inter-working service, an interface between the first communication session and the second communication session;
receiving, by the computer system with the inter-working service, an invitation from a client of the first plurality of client devices for a client of the second plurality of client devices to participate in the first communication session, authorize the invitation;
inviting, by the computer system with the inter-working service, the client of the second plurality of client devices to participate in the first communication session;

receiving, by the computer system with the inter-working service, an acceptance from the client of the second plurality of client devices; and establishing, by the computer system with the inter-working service, a connection between the first communication session and the client of the second plurality of client devices wherein establishing a connection between the first communication session and the client of the second plurality of client devices comprises negotiating codecs between the client of the first plurality of client devices and the client of the second plurality of client devices.

17. The method of claim 16, wherein the walled garden service comprises a Push-To-Talk (PTT) service or a Push-to-talk-Over-Cellular (POC) service.

18. The method of claim 17, wherein the second network comprises a Public Switched Telephone Network (PSTN) or an Internet Protocol (IP) network.

19. The method of claim 18, wherein the second communication session comprises one of a conference, a Voice Over Internet Protocol (VOIP) session, an Instant Messaging (IM) session, an Instant Messaging (IM) multimedia session, and a voice chat session.

20. The method of claim 16, wherein the first communication network and the second communication network are implemented on different technologies or are provided by different service providers.

21. The method of claim 16, wherein the invitation from the client of the first plurality of clients identifies the client of the second plurality of clients.

22. The method of claim 21, wherein the invitation from the client of the first plurality of clients identifies the client of the second plurality of clients based on shared presence information.

23. The method of claim 20, wherein establishing a connection between the first communication session and the client of the second plurality of clients comprises performing media conversion between the first communication session and the client of the second plurality of clients.

24. The method of claim 16, further comprising
receiving, by the computer system with the inter-working service, an invitation from a client of the second plurality of clients for a client of the first plurality of clients to participate in the second communication session;
authorizing, by the computer system with the inter-working service, the invitation;
inviting, by the computer system with the inter-working service, the client of the first plurality of clients to participate in the second communication session;
receiving, by the computer system with the inter-working service, an acceptance from the client of the first plurality of clients; and
establishing, by the computer system with the inter-working service, a connection between the second communication session and the client of the first plurality of clients.

25. The method of claim 24, wherein the invitation from the client of the second plurality of clients identifies the client of the first plurality of clients.

26. The method of claim 25, wherein the invitation from the client of the second plurality of clients identifies the client of the first plurality of clients based on shared presence information.

27. The method of claim 24, wherein establishing a connection between the second communication session and the client of the first plurality of clients comprises negotiating codecs between the client of the first plurality of clients and the client of the second plurality of clients.

28. The method of claim 24, wherein establishing a connection between the second communication session and the client of the first plurality of clients comprises performing media conversion between the second communication session and the client of the first plurality of clients.

29. The method of claim 25, further comprising providing, by the computer system with the inter-working service, floor control functions for the first communication session.

30. The method of claim 29, further comprising providing, by the computer system with the inter-working service, the floor control functions to the second communication session.

31. A computer-readable memory comprising a set of instructions stored therein which, when executed by a processor, causes the processor to provide inter- working with a walled garden service by:
executing an inter-working service, the inter-working service coupled with a first communication network and a second communication network, the first communication network adapted to provide a walled garden service and support a first communication session of the walled garden service between a first plurality of client devices, the second communication network adapted to support a second communication session between a second plurality of client devices, wherein the second communication session occurs outside of the walled garden service;
participating in the first communication session as a client of the walled garden service;
participating in the second communication session as a client of the second communication session;
providing an interface between the first communication session and the second communication session;
receiving an invitation from a client of the first plurality of client devices for a client of the second plurality of client devices to participate in the first communication session, authorize the invitation;
inviting the client of the second plurality of client devices to participate in the first communication session;
receiving an acceptance from the client of the second plurality of client devices; and
establishing a connection between the first communication session and the client of the second plurality of client devices wherein establishing a connection between the first communication session and the client of the second plurality of client devices comprises negotiating codecs between the client of the first plurality of client devices and the client of the second plurality of client devices.

* * * * *

UNITED STATES PATENT AND TRADEMARK OFFICE
CERTIFICATE OF CORRECTION

| | | |
|---|---|---|
| PATENT NO. | : 8,583,830 B2 | Page 1 of 1 |
| APPLICATION NO. | : 12/948075 | |
| DATED | : November 12, 2013 | |
| INVENTOR(S) | : Maes | |

It is certified that error appears in the above-identified patent and that said Letters Patent is hereby corrected as shown below:

In the Specification

In column 5, line 38, delete "thereof" and insert -- thereof. --, therefor.

In column 6, line 52, delete "may can" and insert -- may --, therefor.

In column 12, line 40, delete "invites" and insert -- invite --, therefor.

In column 12, line 48, delete "know" and insert -- known --, therefor.

In the Claims

In column 17, line 18, in Claim 1, delete "communicatively:" and insert -- communicatively, --, therefor.

In column 17, line 52, in Claim 4, delete "Intermit" and insert -- Internet --, therefor.

In column 18, line 6, in Claim 9, delete "second se~" and insert -- second --, therefor.

Signed and Sealed this
Tenth Day of June, 2014

Michelle K. Lee
*Deputy Director of the United States Patent and Trademark Office*